United States Patent [19]

Broudy et al.

[11] Patent Number: 5,372,426
[45] Date of Patent: Dec. 13, 1994

[54] THERMAL CONDITION SENSOR SYSTEM FOR MONITORING EQUIPMENT OPERATION

[75] Inventors: Robert M. Broudy, Mercer Island; Edward C. Goldstick, Seattle; David A. Holm, Issaquah; Federick B. Holt; Alan N. Iverson; James L. Tylee, all of Seattle; Dietrich E. Riemer, Auburn, all of Wash.

[73] Assignee: The Boeing Company, Seattle, Wash.

[21] Appl. No.: 171,863

[22] Filed: Dec. 22, 1993

Related U.S. Application Data

[63] Continuation of Ser. No. 849,686, Mar. 11, 1992, abandoned.

[51] Int. Cl.$^5$ .................................................. G01J 5/00
[52] U.S. Cl. ...................................... 374/127; 356/45; 374/121
[58] Field of Search ............... 374/127, 128, 129, 130, 374/131, 121; 250/338.1, 338.3; 356/43, 45; 364/557

[56] References Cited

U.S. PATENT DOCUMENTS

| | | | |
|---|---|---|---|
| 2,687,611 | 8/1954 | Larsen | 60/39.28 |
| 2,785,860 | 3/1957 | Harrison et al. | 236/15 |
| 3,178,579 | 4/1965 | Zuckerbraun | 250/203 |
| 3,539,807 | 11/1970 | Bickel | 250/83.3 |
| 3,611,806 | 10/1971 | Hishikari | 374/129 |
| 3,626,758 | 12/1971 | Stewart et al. | 73/355 |
| 3,631,254 | 12/1971 | Covault | 250/225 |
| 4,326,798 | 4/1982 | Kahn | 356/45 |
| 4,523,092 | 6/1985 | Nelson | 374/131 |
| 4,561,786 | 12/1985 | Anderson | 374/127 |
| 4,576,486 | 3/1986 | Dills | 374/131 |
| 4,657,386 | 4/1987 | Svarez-Gonzalez et al. | 374/127 |
| 4,659,234 | 4/1987 | Brouwer et al. | 374/127 |
| 4,741,626 | 5/1988 | Hashimoto | 374/133 |
| 4,764,025 | 8/1988 | Jensen | 374/144 |
| 4,794,619 | 12/1988 | Tregay | 374/131 |
| 4,924,478 | 5/1990 | Tank | 374/121 |
| 5,051,595 | 9/1991 | Kern et al. | 250/458.1 |

FOREIGN PATENT DOCUMENTS

| | | |
|---|---|---|
| 2067248 | 3/1991 | Canada . |
| 0129150 | 12/1984 | European Pat. Off. . |
| 0419046 | 3/1991 | European Pat. Off. . |
| 0420108 | 4/1991 | European Pat. Off. . |
| 456412 | 11/1991 | European Pat. Off. ............. 356/45 |
| 3149523 | 6/1983 | Germany . |
| 58-139037 | 8/1983 | Japan ................... 374/127 |
| 58-204439 | 11/1983 | Japan ................... 374/127 |
| 2113384 | 8/1983 | United Kingdom . |

Primary Examiner—William A. Cuchlinski, Jr.
Assistant Examiner—G. Bradley Bennett
Attorney, Agent, or Firm—Foley and Lardner

[57] ABSTRACT

A thermal condition sensor system monitors equipment such as aircraft engines. The thermal condition sensor system includes a collector which collects radiation from the equipment and a detector assembly which detects collected radiation over a discriminating spectral band region in at least three spectral bands and generates signals representative of detected radiation in each spectral band. A processor receives the signals and generates a report of the thermal conditions of the equipment using interband comparison of the at least three spectral bands.

34 Claims, 23 Drawing Sheets

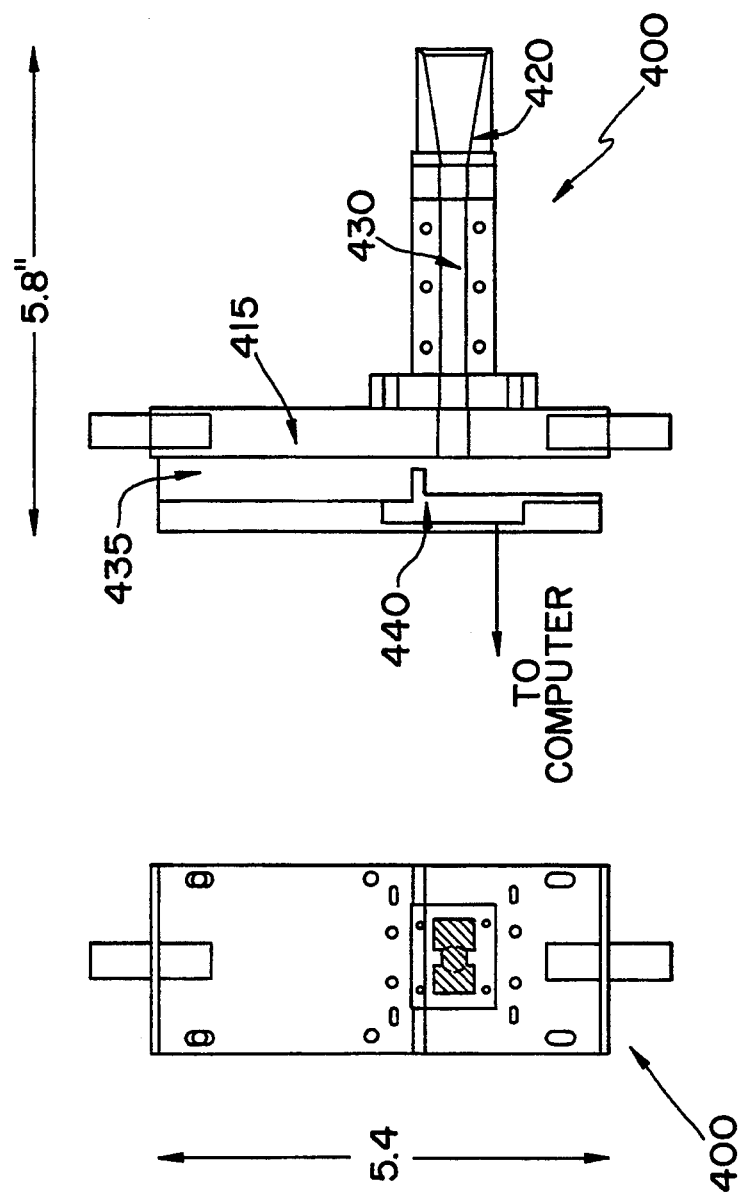

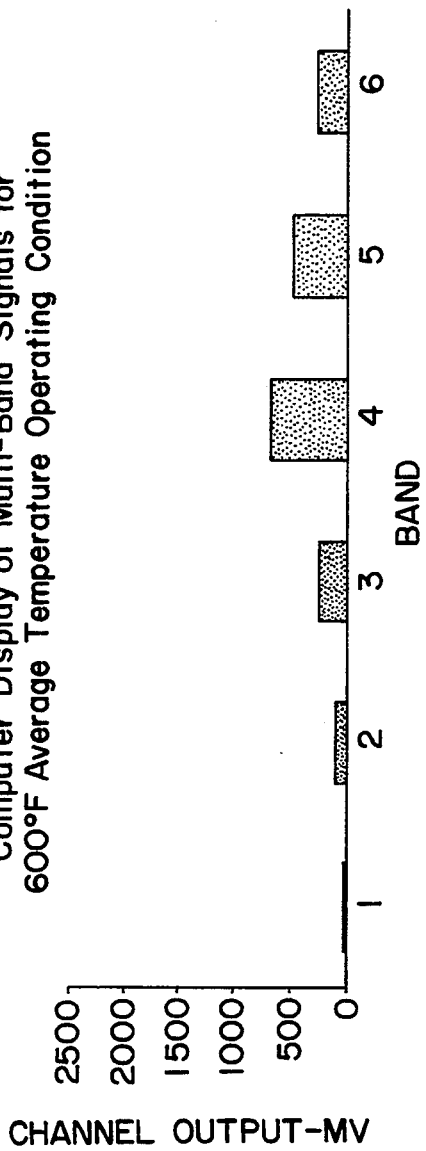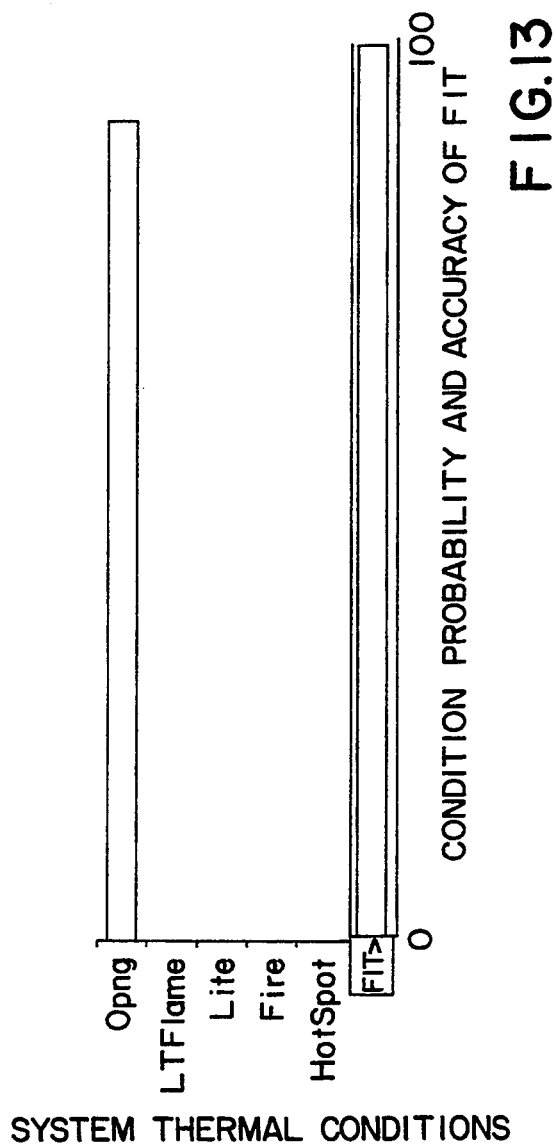

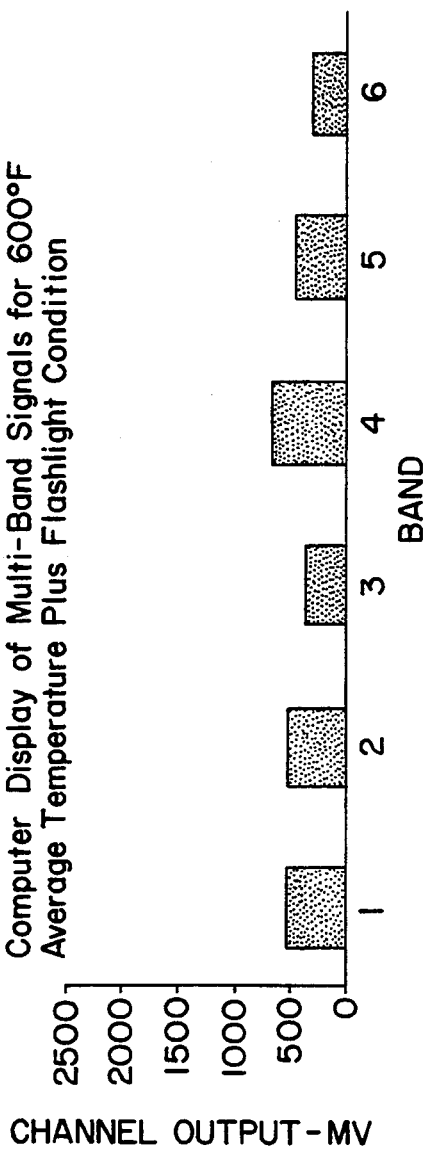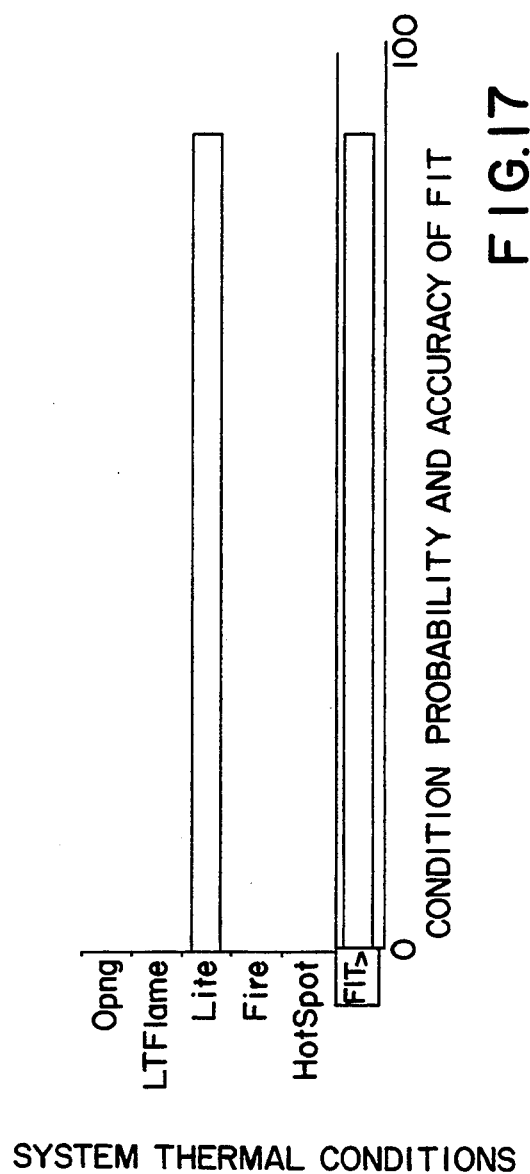

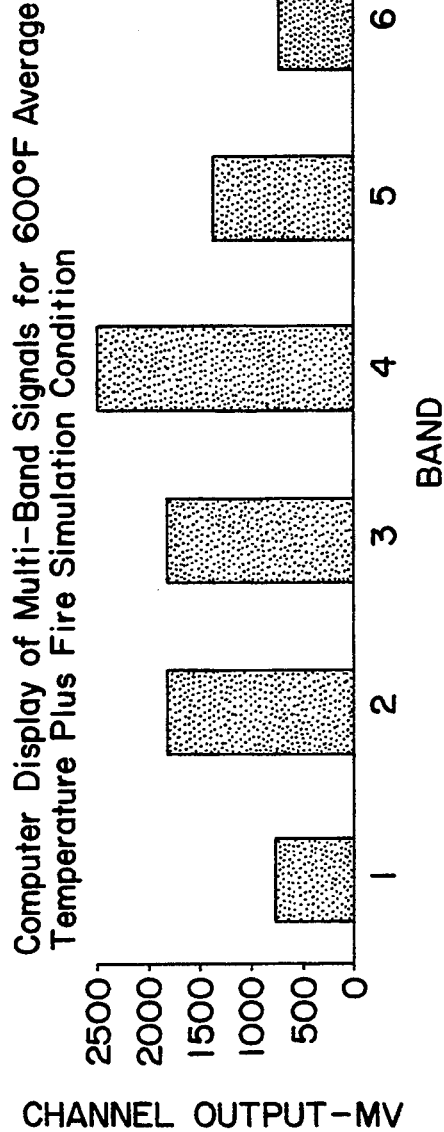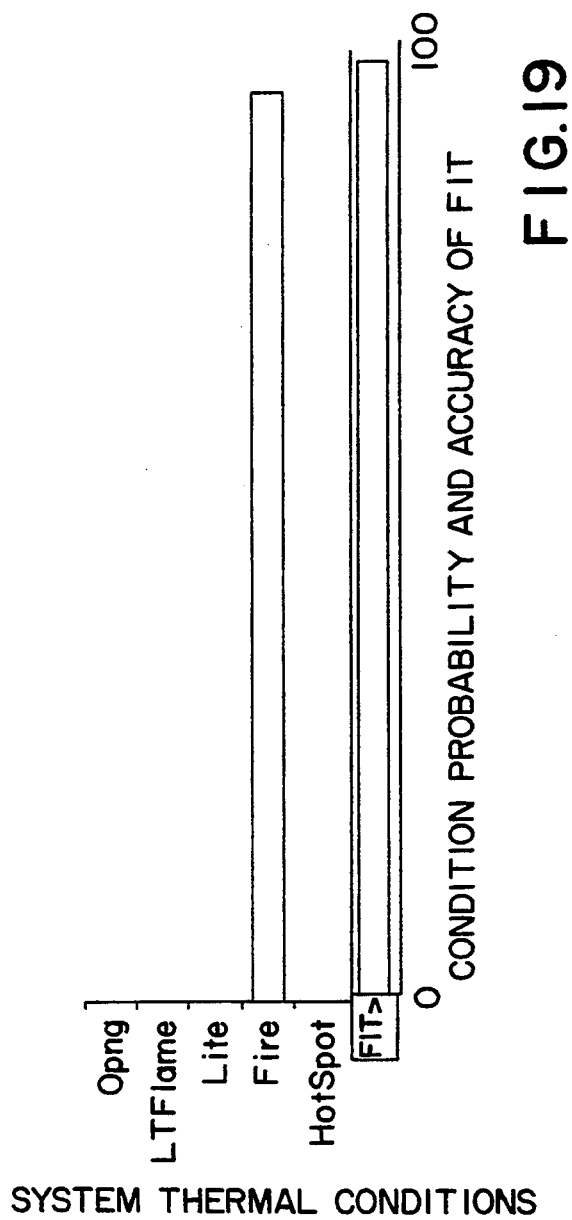

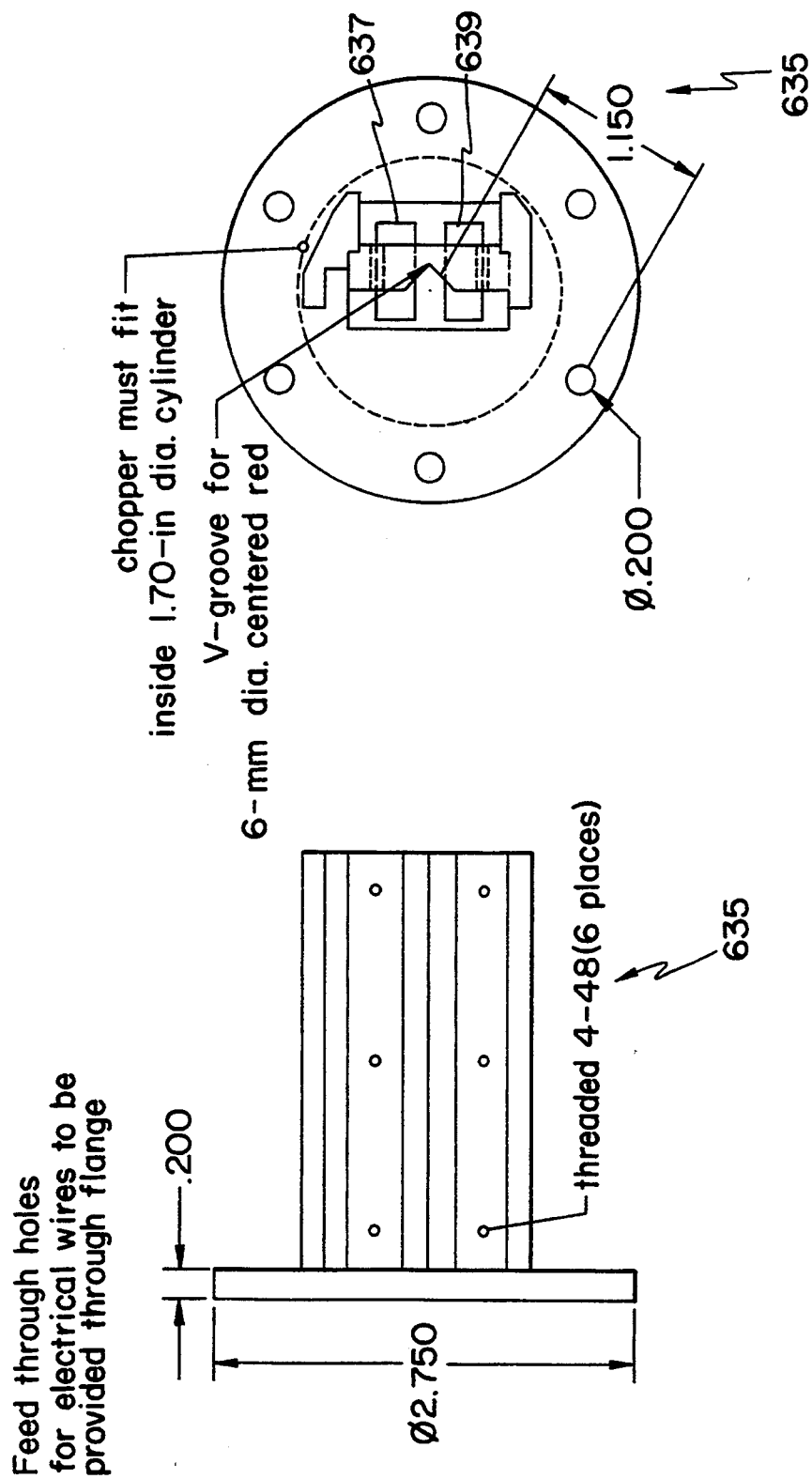

THERMAL CONDITION SENSOR SYSTEM FOR MONITORING EQUIPMENT OPERATION

This application is a continuation of application Ser. No. 07/849,686, filed Mar. 11, 1992, now abandoned.

BACKGROUND OF THE INVENTION

The invention relates to thermal condition sensor systems. More specifically, the invention is directed to a sensor system for monitoring the thermal condition of operating equipment, such as aircraft engines.

Early detection of fire and over-temperature conditions is essential for satisfactory operation of aircraft and other equipment. Unfortunately, current sensor systems are limited in reliability and maintainability as a consequence of their basic design and method of operation. Conventional sensors must be placed in contact with the source of heat, thereby subjecting the sensors to thermal and mechanical degradation. In aircraft engine nacelles, for example, fire and overheating are detected by closed loop systems which are placed directly on the engine. The presence of abnormally high temperatures is sensed by changes in the electrical resistance of enclosed wires or changes in the pressure of gases. At other locations, the presence of abnormal conditions is often recognized indirectly utilizing smoke detectors and/or visual explosion detectors.

Some of the disadvantages of conventional sensor systems include (1) generation of spurious indications and false alarms that reduce confidence in the sensor system, (2) negligible monitoring of on-going conditions and lack of recognition of incipient problems, (3) reduced reliability due to exposure to extreme temperature and vibration, (4) difficult and costly maintenance, removal, and replacement, (5) inaccurate indications caused by local temperature excursions, and (6) slow and insensitive smoke detection.

Optical radiometric devices exist which determine temperature and thermal conditions by detection and analysis of emitted optical radiation, but no completely satisfactory method has been provided for reliable fire and over-temperature detection. Conventional radiometric devices provide limited discrimination between thermal sources, respond to only a single environmental condition, and are not rugged enough for use in severe environments—such as in the vicinity of an aircraft engine to monitor engine operation.

Thus, there is a real need for a thermal condition monitoring system which is rugged enough to be used in severe environments, which need not be placed in contact with the source of heat, which is sensitive to multiple environmental conditions, and which does not give false alarms.

SUMMARY OF THE INVENTION

It is an object of the invention to provide a thermal condition sensor system which provides unambiguous identification of many conditions and which minimizes false alarms.

It is another object of the invention to provide a thermal condition sensor system which is rugged and compact and which can withstand severe environmental conditions.

Another object of the invention is to provide a thermal condition sensor system which does not rely on lens-based optics.

Yet another object of the invention is to provide a thermal condition sensor system which collects radiation from a precisely controlled field-of-view.

Another object of the invention is to provide a thermal condition sensor system which has a self-checking capability.

Another object is to provide a thermal condition sensor system which ascertains environmental conditions from indirect, that is, non-line-of-sight, radiation.

According to one aspect of the invention there is provided a thermal condition sensor system for monitoring equipment, for example, aircraft engines. The thermal condition sensor system includes a collector which collects radiation from the equipment and a detector assembly which detects collected radiation over a discriminating spectral band region in at least three spectral bands and generates signals representative of the detected radiation in each spectral band. The collector need not contact the equipment being monitored. A processor receives the signals and generates a report of the thermal conditions of the equipment using interband comparisons of at least three spectral bands. Use of at least six spectral bands in the range of 1 to 5 microns has proved to be particularly advantageous when monitoring aircraft engines.

The thermal condition sensor system may also include a reference channel which emits radiation having known characteristics into the vicinity of the equipment being monitored and which collects the emitted radiation. A resonant tuning fork chopper may also be provided to modulate the collected radiation.

These and other objects, features, and advantages of the invention will be apparent from the following detailed description of preferred embodiments.

BRIEF DESCRIPTION OF THE DRAWINGS

The invention will be described in further detail below in conjunction with the accompanying drawings, wherein:

FIG. 8 is a side view outline drawing of a sensor used for initial experimental testing;

FIG. 9 is an end view outline drawing of the sensor used for initial experimental testing;

FIG. 12 is a computer display of multi-band signals for a 600° F. average temperature operating condition;

FIG. 13 is a computer display showing the condition probability and accuracy of fit corresponding to FIG. 12;

FIG. 16 is a computer display of multi-band signals for a 600° F. average temperature condition plus a flashlight condition;

FIG. 17 is a computer display showing the condition probability and accuracy of fit corresponding to FIG. 16;

FIG. 18 is a computer display of multi-band signals for a 600° F. average temperature condition plus a fire simulation condition;

FIG. 19 is a computer display showing the condition probability and accuracy of fit corresponding to FIG. 18;

FIG. 30 is a top view of a chopper of FIG. 22;

FIG. 31 is an end view of the chopper of FIG. 22;

DETAILED DESCRIPTION OF PREFERRED EMBODIMENTS

Figure 1:
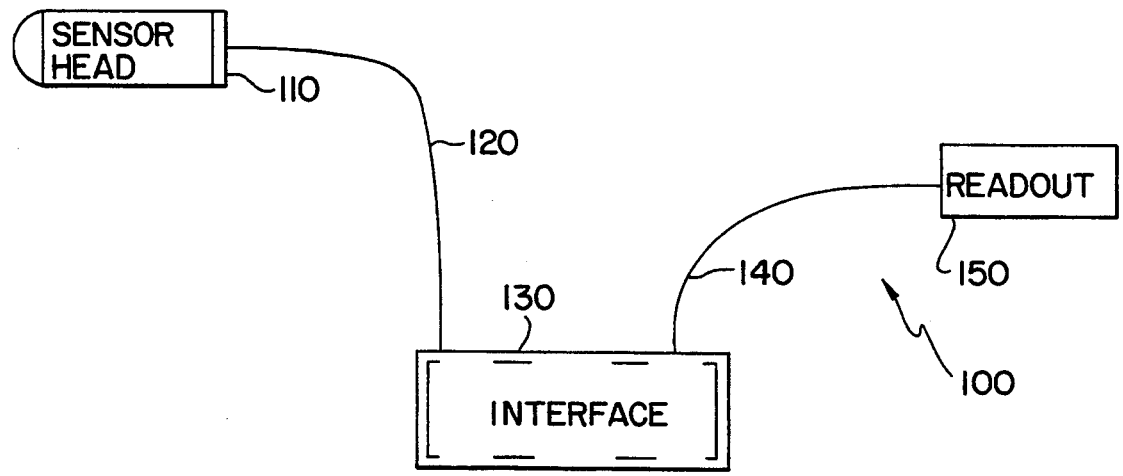
FIG. 1 illustrates a basic common configuration of the invention.

The instant invention is a complete thermal condition sensor system for the remote determination of thermal conditions in a wide variety of environments. In the invention, complex thermal characteristics are identified through the use of special processing and analysis of optical radiant energy that is present in any physical system. Applications for the invention include fire and incipient fire detection, over-temperature recognition, and the real-time monitoring of the operating "health" of equipment. Reflected as well as line-of-sight radiation is efficiently detected while undesired background radiation is discriminated. Our laboratory experiments and analyses have demonstrated that conditions can be detected in aircraft and other applications by a few sensor heads placed at strategic locations.

The invention collects all of the optical energy incident on a sensor over a delineated field-of-view and separates this energy into a number of carefully selected spectral bands. It is important that optical energy be collected over a precisely delineated field-of-view to limit the collection of optical energy to optical energy emitted from the equipment being monitored.

Radiation is detected over a discriminating spectral band region. A discriminating spectral band region is a spectral region which is wide enough to provide enough spectral information to discriminate among the various thermal conditions of interest. For example, when the invention is used to monitor aircraft engines, a spectral band region of several microns is employed to discriminate among the various thermal conditions of interest. A spectral band region of a fraction of a micron would not be sufficient to discriminate among the various thermal conditions of interest. Thus, a fraction of a micron is not a discriminating spectral band region for monitoring typical aircraft engines. Detecting radiation over the discriminating spectral band region, as opposed to detecting radiation in a few narrow bands within the discriminating spectral band region, is important because this maximizes the amount of optical information available for subsequent analysis.

The optical energy is transformed into electrical signals having an amplitude proportional to the intensity of optical radiation in each band. Then, the thermal conditions of the equipment being monitored are determined from the relative signal intensities of the spectral bands. Each thermal condition of interest is identified by a unique spectral signature composed of selected bands.

For example, in certain aircraft engine monitoring applications, sensors cover the spectral region from 1 to 5 micrometers using six spectral bands. An optional ultraviolet band near 0.3 micrometers can also be included. Fields-of-view are usually selected in a range from 10 to 30 degrees for most nacelles.

The instant invention is fundamentally different from conventional radiometers that are designed to measure temperature, rather than a wide variety of thermal conditions. Furthermore, conventional radiometers use two, or at most three, narrow spectral bands from a limited spectral region.

The instant invention is designed for application to many real world situations. The invention is rugged, compact, has a reduced life-cycle cost, a simple installation, and is resistant to severe environments. Each part of the sensor system—optical, electronic, structural, and data processing—has been developed to satisfy these requirements.

An important feature of the invention is the use of many optical filters to generate multiple band spectral information and the use of interband data to determine the thermal conditions of the equipment being monitored. This technique minimizes the effects of variations in the emissivity, detector efficiency, and the amount of reflected radiation, and also provides a mechanism for redundant self-checking.

The invention has improved reliability, a self-checking capability, and superior resistance to radiation. Particular components are shared to provide a simpler, more elegant, and more cost effective design. The invention is implemented using developed technology. At the same time, the invention can accommodate future advances in sensor technology.

Basic Configuration

FIG. 1 illustrates a basic common configuration 100 that encompasses the invention. The FIG. 1 design is particularly useful for present and future generation aircraft where a reliable and rugged apparatus is required to measure pressures, temperatures, and the relative proximity of various structures. The term aircraft as used herein (including the claims) encompasses spacecraft.

The FIG. 1 configuration includes a sensor head 110 which senses, for example, pressure, temperature, proximity, and/or standoff temperature. Standoff temperature refers to the measurement of temperature at a distance. The sensor head 110 is connected to an interface 130 by an optical transmission fiber 120. The interface 130 can be made from silicon-based components. The interface 130 is in turn connected to a readout unit 150 via an optical transmission fiber 140. The readout unit 150 indicates and/or displays sensed parameters.

The invention employs new concepts in filter radiometry and applies new technology to these concepts. More specifically, the invention determines thermal parameters using multiple band spectral radiation collected from the equipment being monitored.

Figure 2:
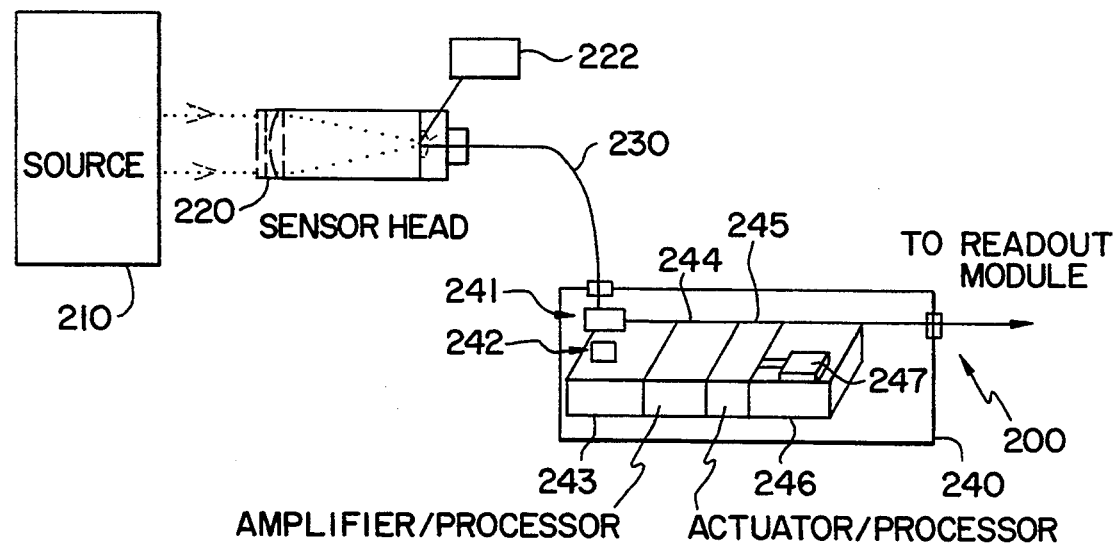
FIG. 2 illustrates a standoff temperature sensor system according to one preferred embodiment of the invention.

An example of a thermal sensor system 200 is illustrated in FIG. 2. The thermal sensor system 200 determines temperature(s) using special methods for detection and analysis of optical radiation emitted from source 210. The thermal source 210 in FIG. 2 represents the equipment whose thermal conditions are being monitored. The sensor head 220 includes a plurality of fiber receptors 222 each of which is sensitive to a different wavelength band of radiation emitted from source 210. Alternatively, a single fiber receptor at the sensor head can be separated into a plurality of fibers elsewhere in the system.

The sensor head 220 is connected to a central unit 240 via fiber optic cable 230. The central unit 240 can be built from silicon-based components. In the central unit 240, signals from sensor head 220 are processed by a multiplexer/chopper, or core unit, 241; a detector 242; an input unit 243; an amplifier/processor 244; an actuator/processor 245; and an output unit 246, which drives LED (light emitting diode) 247.

Multiplexer/chopper 241 is a serial or parallel multiplexer which performs the dual functions of channel separation and optical signal chopping for detector 242. Improved signal-to-noise performance and detector stability in complex environments are obtained by optical chopping for narrow band signal processing. Optical chopping is also required for pyroelectric detectors, which respond only to variations in optical intensity. Pyroelectric detectors possess high and uniform responsivity over the 1 to 5 micrometer spectral region (as well as in the ultraviolet region) and are rugged, require no cooling, and maintain performance from low temperatures ($-65°$ C.) to high temperatures ($150°$ C.). Data from detector 242 are conditioned and processed to eliminate the effects of undesired variations and is then used to actuate an output module, such as an LED or a diaphragm light modulator, in the desired format.

The detector 242 is constructed from components capable of operating at room temperature, such as pyroelectric devices. Sensitivity can be greatly increased, if required for a particular application, by use of a cooled detector.

Figure 3:
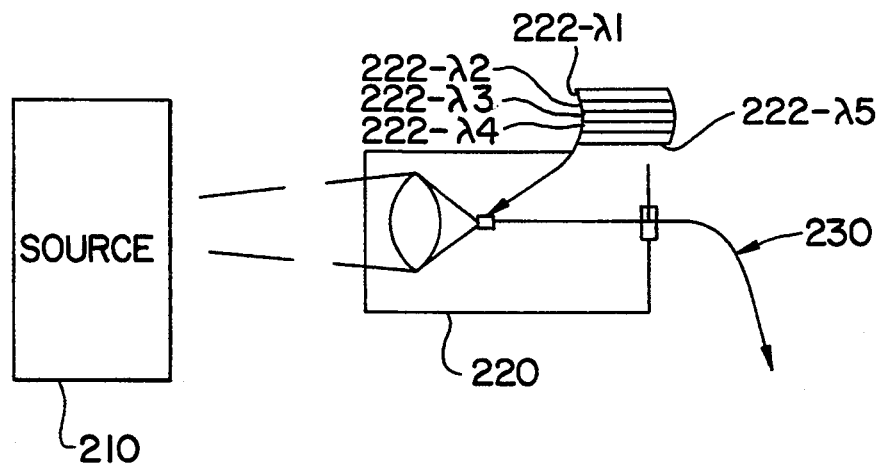
FIG. 3 illustrates a fiber bundle for the FIG. 2 standoff temperature sensor system.
Figure 4:
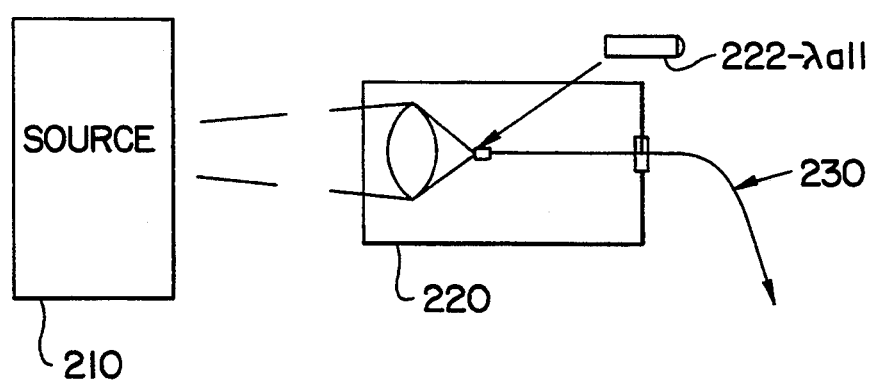
FIG. 4 illustrates a single fiber receptor for the FIG. 2 standoff temperature sensor system.

Radiation collecting fibers in the sensor head 220 can be bundled as illustrated in FIG. 3 by fiber bundles 222-$\lambda 1$, 222-$\lambda 2$, 222-$\lambda 3$, 222-$\lambda 4$, and 222-$\lambda 5$. Alternatively, the sensor head can be provided with a single fiber receptor 222-$\lambda$all, as illustrated in FIG. 4. When the FIG. 4 design is used, the radiation collected by the sensor head 220 is subsequently separated and spectrally decomposed by, for example, a grating, a prism, fiber filters, or special fiber terminations.

Because the FIG. 2 design collects data concerning the thermal conditions of source 210 at a distance, the sensor head 220 can be placed at a relatively cool location some distance from source 210. Placement of the sensor head 220 at a relatively cool location eliminates high temperatures at the connectors and other components of sensor head 220; which in turn eliminates a major cause of degradation that occurs in conventional devices.

The principles underlying the interband analysis technique will now be described in detail. To illustrate the feasibility of the interband analysis technique, an initial analysis was performed for five spectral bands, each having a width of 0.4 microns, and extending from 0.5 to 4.0 microns to cover a broad temperature range.

The blackbody optical radiation power in each spectral region $W_{\lambda,\Delta\lambda}$ in watts/cm$^2$ can be expressed by the following equation:

$$W_{\lambda,\Delta\lambda} = C_1 \int_{\lambda-\Delta\lambda/2}^{\lambda+\Delta\lambda/2} \frac{\eta(\lambda)\epsilon(\lambda)d\lambda}{\lambda^5[\exp(C_2/\lambda T) - 1]} \quad (1)$$

where:
$\lambda$ is the center wavelength of bandwidth $\Delta\lambda$;
$\eta(\lambda)$ is the quantum efficiency;
$\epsilon(\lambda)$ is the emissivity;
$C_1$ and $C_2$ are Planck blackbody radiation constants; and
T is temperature.

The spectral band ratio R of the radiation power of one spectral region to the radiation power of another spectral region can be expressed by the following equation:

$$R = W_{\lambda 1, \Delta\lambda}/W_{\lambda 2, \Delta\lambda} \quad (2)$$

It is important to note that for most applications $\epsilon$ and $\eta$ vary slowly enough with $\lambda$ that they can be treated as constants.

The signal-to-noise ratio can be expressed by the following equation:

$$S/N = D^* W_{\lambda,\Delta\lambda} A^{\frac{1}{2}} \Delta f^{\frac{1}{2}} \quad (3)$$

where:
$D^*$ is the detector sensitivity in cm·Hz$^{1/2}$/W;
$\Delta f$ is the detector electrical bandwidth; and
A is the detector area.

Figure 5:
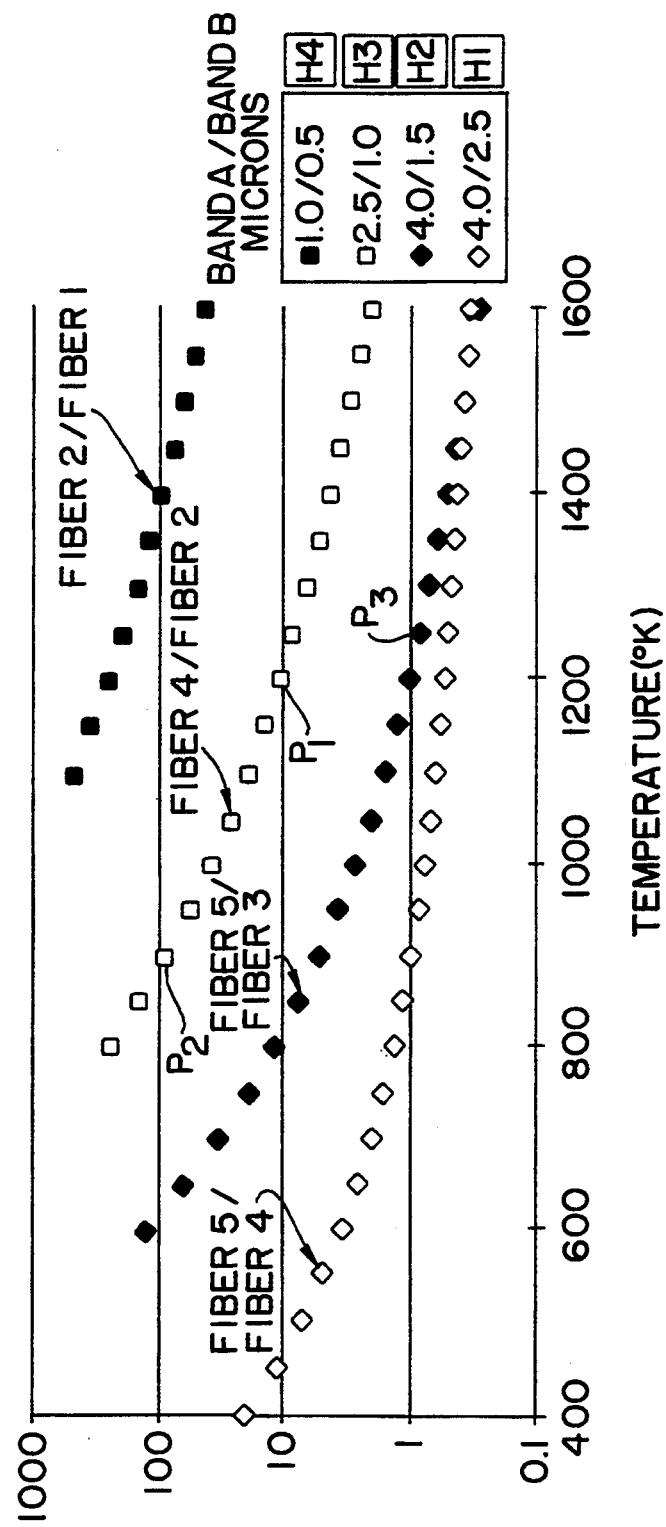
FIG. 5 is a graph of ratios of blackbody temperature in two wavelength regions versus temperature.

Using these formulas, analytical results were obtained for interband ratios over a broad temperature range of 400 Kelvins to 1600 Kelvins, as shown in FIG. 5. FIG. 5 shows the temperature dependence of ratios of signal output for some typical spectral bands. These results demonstrate that: (1) the ratios are unique for each temperature; (2) the temperature dependence of the ratios is large enough for a clear determination of most temperatures of interest; and (3) a useful redundancy exists from the use of multiple bands.

More specifically, FIG. 5 shows ratios of blackbody temperature in two spectral bands versus temperature. FIG. 5 demonstrates that the thermal condition of source 210 can be determined from the ratio of signals from selected fibers. For example, if the ratio of the signal from fiber 4 (fiber 222-$\lambda$4 in FIG. 3) to the signal from fiber 2 (fiber 222-$\lambda$2 in FIG. 3) is 10, as indicated at point $P_1$ in FIG. 5, then the temperature of source 210 is approximately 1200 Kelvins. On the other hand, if the ratio is 100, as indicated at point $P_2$ in FIG. 5, then the temperature of source 210 is approximately 900 Kelvins.

The ratios can also be used to cross-check results. For example, the correctness of the determination that the temperature of source 210 is 1200 Kelvins when the ratio of the signal from fiber 4 to the signal from fiber 2 is 10 can be checked by verifying that the ratio of the signal from fiber 5 (fiber 222-$\lambda$5 in FIG. 3) to the signal from fiber 3 (fiber 222-$\lambda$3 in FIG. 3) is 1.

Additional self-checking is performed by transmitting an optical signal of known characteristics into the area picked up by sensor head 220 using a fiber originating from an LED in central unit 240. Radiation introduced into the area covered by the sensor head in this manner is then collected by fibers 222-$\lambda$1 through 222-$\lambda$5 to provide a unique signal that is used to verify proper operation of thermal sensor system 200.

The design described above in conjunction with FIGS. 1 through 4 is capable of temperature determination over a broad temperature range with an accuracy within a few Kelvins. However, in many applications, recognizing the thermal condition(s) of the monitored equipment is of primary importance rather than simple temperature determination. For example, the presence of a fire can be unequivocally determined and/or equipment can be continuously monitored to verify proper operation. Other examples of the type of thermal conditions that can be monitored include the detection of a low temperature flame condition and the detection of a hot spot condition.

In the invention, measurement is not affected by signal path loss variations. Furthermore, the presence of a fire in the equipment being monitored can be ascertained by detection and analysis of unique spectral signatures due to reflected radiation occurring during a fire. The design also permits all of the electrical components to be placed at one compact location, central unit 240, which is easily shielded.

Specific Installation Examples

The above description sets forth basic principles of the invention. Specific applications and installations will now be described. The spirit and scope of the invention is, of course, not limited to the specific applications and implementations set forth below.

The thermal condition sensor system of the instant invention can be employed to provide improved fire detection, improved overheating detection, and improved operating diagnostics of complex systems, such as aircraft engines. The invention is particularly suitable for these applications due to the remote location of the radiometric sensors of the instant invention, as compared with conventional arrangements in which the sensors are in contact with the equipment being monitored. Contact measurements are subject to spurious indications and false alarms, which in aircraft cause unnecessary in-flight shutdowns, travel redirection, and excessive maintenance and repair costs. The invention also provides on-line system diagnostics which permits recognition of incipient problems in a manner which can not be accomplished in conventional systems.

Figure 6:
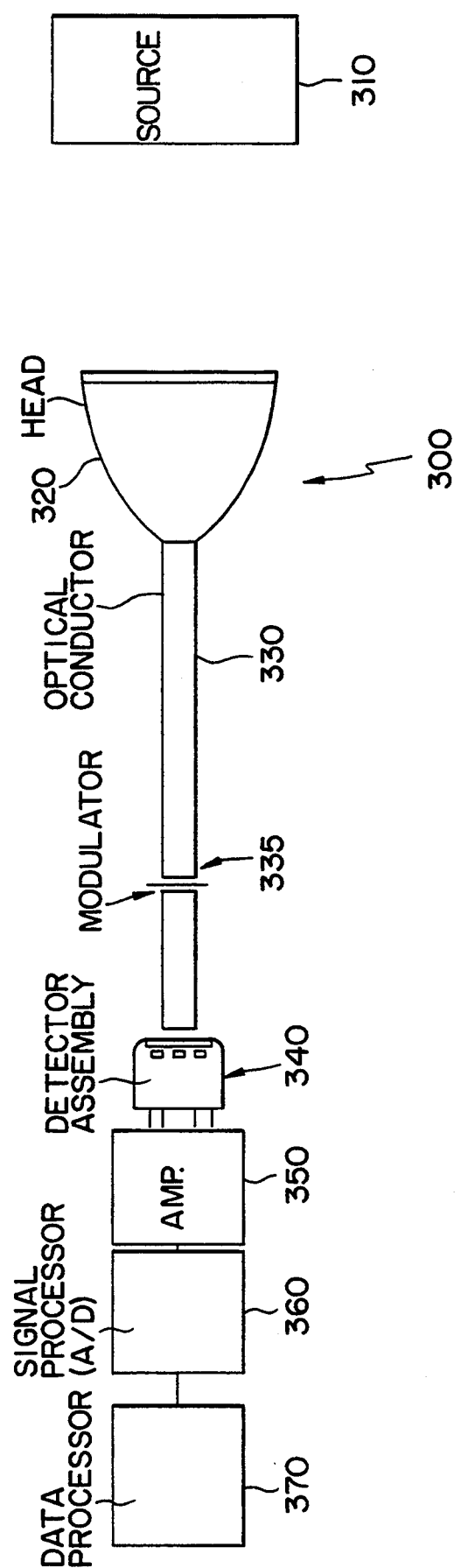
FIG. 6 illustrates another preferred embodiment of the invention.

FIG. 6 illustrates an embodiment of the invention. The FIG. 6 embodiment can be used, for example, to monitor aircraft engines. FIG. 6 is merely an example of one suitable design for a specific installation. The design of FIG. 6 may have to be modified for any given application and/or installation to suit the particular application and installation requirements at hand.

In the FIG. 6 embodiment, a sensor head 320 is placed at a location remote from heat source 310. Heat source 310 is an aircraft engine which requires monitoring. The thermal conditions of source 310 are determined by measurement of the optical radiation emitted from source 310. Line-of-sight viewing of source 310 by sensor head 320 is not required because the sensor head responds to both direct radiation and indirect reflected radiation.

The sensor head 320 collects thermal radiation and transmits the thermal radiation by optical conductor 330 to a detector assembly 340 via an optical modulator 335, which can be placed anywhere in the optical path. The optical conductor 330 has an optical path which is narrower than the optical path of the sensor head 320. The detector assembly 340 separates received optical information into multiple spectral channels or bands and then transforms the spectral channels into electrical signals. Signal processing is then performed in a signal processor 360 to minimize noise and other undesirable fluctuations. Finally, the thermal conditions of source 310 are determined by data processing techniques based on spectral and temporal comparison of seven channels in data processor 370.

Figure 7:
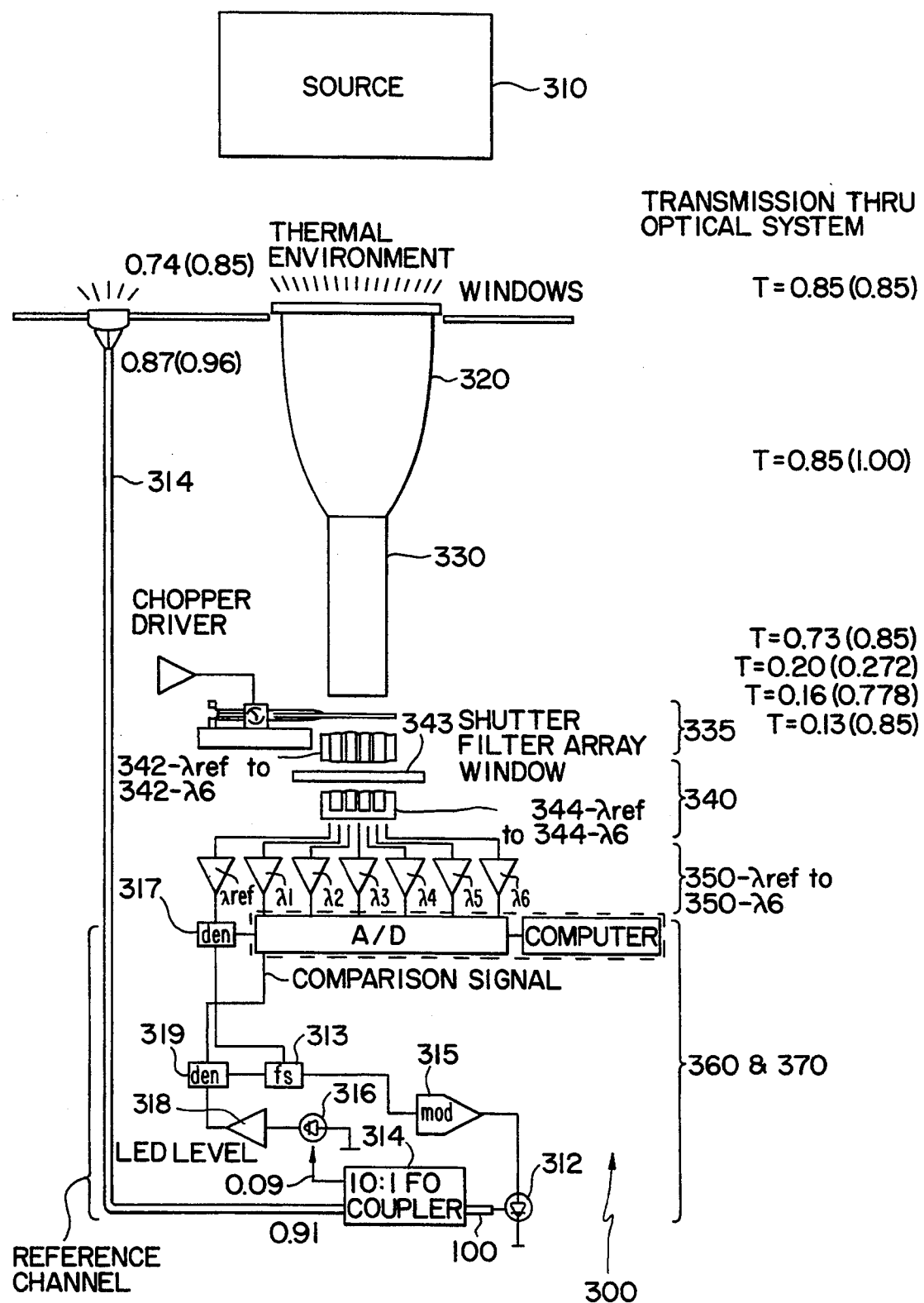
FIG. 7 illustrates the detailed design of the FIG. 6 preferred embodiment.

FIG. 7 illustrates a detailed design for implementation of the FIG. 6 embodiment. The FIG. 7 design covers the spectral region from 1 to 5 microns in six bands, with the potential for easy inclusion of an ultraviolet channel. Use of six or more bands has been found to be particularly effective. Broader or different spectral regions can be selected in accordance with the specific application at hand.

Analysis of typical equipment shows that fire, overtemperature conditions, and normal thermal operation can be recognized at many locations by use of a few strategically placed sensor heads. For example, aircraft propulsion systems can be monitored by placing all or part of the sensor assembly on an airframe strut, where the sensor assembly can view the engine enclosure, or nacelle.

In the FIG. 7 design, non-imaging optical collectors are used in sensor head 320 to collect reflected radiation as well as direct radiation. Radiation is collected over a wide but sharply delineated field-of-view. This design permits discrimination of desired from undesired background signals.

Non-imaging optics are inherently superior when collecting radiation from a wide region rather than from a selected spot, as is the case in conventional lens-based radiometers. Simple lenses lose efficiency due to optical aberrations, which are especially pronounced in the infrared band. Furthermore, lenses require complex mechanical structures to hold the lens in place under the conditions present in aircraft. More complicated lens arrangements reduce aberrations. However, in more complicated arrangements lens alignment becomes even more difficult and costly.

In contrast, the FIG. 7 design uses non-imaging optical collectors which do not require lenses. Therefore, the FIG. 7 design has high collection efficiency without alignment problems. In the adaptation to a particular installation, optical ray tracing programs can be used to analyze and design appropriate optical collectors with high efficiency over the 1 to 5 micron spectral band. An optical collector can be designed for any field-of-view from below 10° to above 45°.

In the FIG. 7 design, the sensor head 320 is isolated from modulator 335 by an optical conductor 330 in the form of a sapphire light pipe or rod. The sapphire rod is replaced with optical fibers when greater separation of the sensor head 320 from the other components in the sensor system 300 is required.

Although the thermal condition sensor system can operate properly with as little as 5% of the optimum signal because the system relies on signal ratios, an indication of possible problems is highly desirable. In the invention, a signal from an independent reference source is transmitted into the vicinity of the monitored equipment by a fiber and is then captured in a seventh, or reference, channel to monitor optical transmission and to detect any obscuration in the collection equipment. This allows self-checking independent of the characteristics of the equipment being monitored. Thus, a quantitative indication of the integrity of the optical path is continuously provided. That is, there is a continuous indication of any signal reduction due to an obstruction, obscuration, or other abnormal condition. A suitable detailed design for the reference channel will be described in further detail below.

When it is necessary to determine precise temperatures of a specific portion of the equipment being monitored, special narrow field-of-view non-imaging optics can be used, as well as lens systems that directly view an accessible portion of the equipment being monitored.

In many applications, such as engine fire sensing, the thermal condition sensor system 300 must survive in a severe environment. The system must perform in the presence of sand and moisture, and must withstand thermal excursions and other sources of degradation. The thermal condition sensor system 300 meets these environmental requirements by structurally, spatially, and thermally separating the sensor head 320 (which is subjected to the highest temperatures) from the remaining components of the system. The sensor head 320 is located in a position to view the area being monitored and optical conductor 330 transmits the collected optical radiation some distance away to modulator 335, detector assembly 340, signal processor 360, and data processor 370.

Optical conductor 330 is a rod of sapphire. A sapphire rod is used because a sapphire rod is rugged and has high optical transmission in the 1 to 5 micron and ultraviolet regions. Fiber-optics can be used instead of a sapphire rod. Use of fiber-optics makes the design compatible with next-generation fiber-optic systems. It is important to place the optical conductor 330 output within a few millimeters of detector assembly 340 to minimize signal loss.

In the FIG. 6 and 7 design, improved signal-to-noise performance and detector stability is obtained by optically chopping the collected optical signals to permit narrow-band signal processing. Modulation also produces the varying signals necessary when pyroelectric detectors are employed. Pyroelectric detectors are a type of thermal sensor which responds to the local temperature increase caused by absorption of optical radiation. A pyroelectric detector includes capacitor plates which enclose material which has a permanent electric dipole moment that is temperature dependent. Pyroelectric detectors respond only to changes in the electric dipole moment because the DC (direct current) polarization is zero due to the presence of slow neutralizing surface charges.

Use of rotating parts in a modulator is undesirable in applications requiring high stability and maintainability. Therefore, in the FIG. 6 and 7 design, optical modulation is obtained using a vibrating electromechanical type chopper for maximum optical efficiency without the use of rotating parts. A suitable chopper design will be described in further detail below in connection with FIGS. 30 through 33.

A modulation frequency of 71 Hz is used to minimize stray signals and to maintain signal-to-noise values near optimum. The use of electromechanical chopping to accomplish optical modulation results in low power requirements and a long-lifetime system which does not require lubrication.

Detection of the collected optical signals over the desired spectral regions is accomplished by a multichannel detector array of six detectors 344-$\lambda$1 to 344-$\lambda$6. The detectors in the detector array are closely spaced to assure receiving most of the optical radiation emerging from the optical conductor 330. Pyroelectric detectors are used for detectors 344-$\lambda$1 to 344-$\lambda$6 because pyroelectric detectors have high and uniform response over the 1 to 5 micron and ultraviolet bands. Pyroelectric detectors are also rugged, require no cooling, and maintain performance from low temperatures ($-65°$ C.) to high temperatures (150° C.).

A detector 344-$\lambda$ref for the reference channel is also included in the detector array. Detector 344-$\lambda$ref is a silicon photodiode.

The spectral response of the channels is determined by optical filters 342-$\lambda$1 to 342-$\lambda$6, which are each selected to pass a desired spectral band. The optical filters 342-$\lambda$1 to 342-$\lambda$6 are placed immediately in front of each detector in the detector array. Window 343 is a cover to protect the detector elements.

The spectral regions cover the range of 1 to 5 microns in six or more bands and can include a solar-blind ultraviolet band. If semi-quantitative information rather than precise temperature measurement is desired, the spectral bands are relatively wide and cover the entire spectral region to obtain maximum information. Applications which require semi-quantitative information include the detection of fire and other over-temperature conditions, and monitoring of the overall operation of equipment.

The filter and detector assembly provides compact and efficient detection because the detector elements are placed close together. Use of a compact detector array assembly with integral detectors and filters also provides a rugged and low cost design. A suitable detailed design for the detector assembly is set forth below in connection with FIGS. 34 and 35.

Pre-amplifiers 350-$\lambda$ref to 2150-$\lambda$6 include narrowband signal processors to eliminate the effects of system vibration and other spurious effects. The output from each pyroelectric detector is processed by a two stage amplifier which raises the signal level to the level required to drive the signal processor. Each amplifier is a tuned design and operates at a center frequency of 71 Hz (the mechanical chopper frequency) with a typical bandwidth of 10 Hz. The outputs of pre-amplifiers 350-$\lambda$ref to 350-$\lambda$6 are sent to signal processor 360 and data processor 370. The signal processing and data processing that is performed in signal processor 360 and data processor 370 will now be described in detail.

A principal function of the thermal condition sensor system 300 is to determine overall system thermal conditions using multiple spectral band information. Thermal radiation over a wide spectral range is separated into a number of bands of thermal radiation. Relative comparison of the detected signals from these spectral bands produces a unique signature for each operating condition.

Multi-band signatures of the equipment to be monitored are first ascertained for selected conditions of operation to provide a baseline for later comparison. Spectral signatures are determined, for example, for taxiing, takeoff, and operating at altitude. Multi-band spectral signatures are also determined for pathologic conditions such as fire and overheating. The signatures can be ascertained either experimentally or analytically.

In actual operation, the performance of the equipment being monitored is continuously monitored by decomposing the detected signals into the contributions made by each individual operating condition. Thus, the thermal condition sensor system 300 monitors equipment operation in real time and also serves as a fire and overheat detector. Spurious radiation, such as radiation from artificial and solar illumination, is recognized and discriminated using the same technique.

Data analyses are performed using one of several analytical techniques that compare signals from many channels. In all of these analytical techniques, the object is to identify each thermal condition using the relative intensities of the multi-band thermal signals that are characteristic of each condition. Once a unique thermal signature for each thermal condition of interest has been developed, the data analysis recognizes and unequivocally indicates the thermal condition that generated the detected signature. For example, a six band thermal condition sensor system uses six numbers, each of which is proportional to the detected optical energy in a particular spectral band, for thermal condition identification.

There are many analytical techniques that compare signals from many channels, including pattern recognition, multi-dimensional (for example, six-dimensional) analysis, and other techniques. Three techniques, each of which is based on well-known theory, will be described below. Each of these three techniques can successfully detect and discriminate thermal conditions:

(1) A least squares analysis that determines the most probable thermal condition;
(2) A Kalman filter analysis that detects changes from normal operating conditions; and
(3) A rule-based analysis that is a type of expert system for recognition of thermal conditions based on the multi-channel output.

In the preferred embodiment, each analysis technique is coded in the C language for operation on an Intel 80196 microcontroller. A wide variety of other processors and languages can also be used. In a particularly preferred embodiment, the best features of all three analysis techniques are employed by the thermal condition sensor system.

The principles underlying these three analysis techniques will now be described.

Least Squares Analysis

This technique compares the detected multi-channel signals to those that have been stored in memory for the thermal conditions of interest. Then, the relative contribution of each thermal condition to the detected signals is computed by performing a least squares minimization of the difference between the actual detected measurements and the stored measurements.

The contribution of each of these individual components to the overall signals is defined by the vector x as follows:

$$x^T = [x_1 x_2 \ldots x_N] \quad (4)$$

where T represents a vector transpose operation. The vector x is computed by minimizing the square of the difference between actual and modeled measurements. Actual power is measured in M bands, or channels. The object is to minimize a performance index J, which is defined as follows:

$$J = \sum_{j=1}^{M} [P_{mj} - P_j(x)]^2 \quad (5)$$

where $P_{mj}$ is the actual measured power in the j-th band; and
$P_j(x)$ is the modeled power in the j-th band.

If power in the j-th spectral band $P_j(x)$ is a linear combination of N component parts, the following relationship holds:

$$P_j(x) = b_j + \sum_{i=1}^{N} x_i S_{ij} \quad j = 1, \ldots, M \quad (6)$$

where $b_j$ is the j-th channel bias; and
$S_{ij}$ is the power in the j-th channel associated with the i-th component.

Thus, x is determined by minimizing J in accordance with the following equation:

$$J = \sum_{j=1}^{M} \left[ (P_{mj} - b_j) - \sum_{i=1}^{N} x_i S_{ij} \right]^2 \quad (7)$$

where $x_i \geq 0$ for all $i = 1, \ldots, N$.

Kalman Filter-Based Analysis

This technique is particularly effective for the detection and discrimination of a fire in the presence of at least one other monitored operating condition. This analysis technique is based on the experimental and analytical observation that a fire manifests itself as a major bias in each measured spectral band. Kalman filter-based analysis determines the magnitude of the bias in each band, and compares the computed bias terms with those expected from a fire to provide a fire/no fire binary decision.

Rule-Based Approach

This analysis technique employs an analytical and experimental experience base of the relative relationships among multi-channel signals expected to result from various conditions of interest. The experience base is stored as a series of rules that describe relative multi-channel (for example, six-channel) behavior under various thermal conditions. The detected outputs are then compared with these rules.

Rule-based analysis is particularly helpful as an addition to other algorithms to verify predicted behavior and to quickly detect pathological conditions, such as open circuits, short circuits, and the like, in the thermal condition sensor system itself.

In summary, regardless of the analysis technique used, radiation is collected over a wide spectral band and is separated into many channels. This results in maximum information gathering and results in the elimination of the effects of variations in emissivity, reflectivity, and efficiency because the data analysis depends on relative values instead of absolute values. This approach permits unique evaluation of the monitored equipment and also provides self-checking and multiple redundancy. Use of multiple optical channels over a wide spectral band provides discrimination, sensitivity, and redundancy that is not possible with two-color systems.

The reference channel illustrated in FIG. 7 provides an additional and independent source of self-checking as well as continuous monitoring for obscuration in the optical path. An internal source of optical radiation in the form of LED 312 is provided to illuminate the immediate external environment of the sensor head 320 so that some of the radiation reaches the reference detector 344-$\lambda$ref through the sensor head 320. LED 312 is pulsed by a 1 KHz square wave generated by source 313 and modulator 315. The signal from the reference detector is demodulated by demodulator 317 and then compared in data processor 370 to a comparison signal generated internally. The comparison signal indicates whether LED 312 is operating properly. To generate the comparison signal, a small fraction of the radiation from LED 312 is split off by 10:1 fiber optic coupler 314 to illuminate an internal silicon photodiode 316. The radiation not directed to internal diode 316 is conducted to the immediate external environment of the sensor head 320 by optical fiber 314. The signal from photodiode 316 is amplified by amplifier 318, demodulated by demodulator 319, and then sent to data processor 370 as the comparison signal. If the signal from reference detector 344-$\lambda$ref decreases while the comparison signal indicates that LED 312 is operating properly, then obscuration in the optical path through sensor head 320 exists.

Other designs for the reference channel can be used instead of the design illustrated in FIG. 7.

Experimental Confirmation Testing

Figure 10:
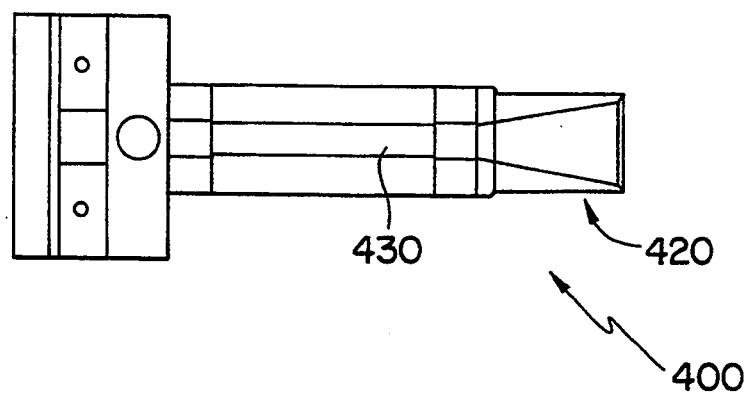
FIG. 10 is a top view outline drawing of the sensor used for initial experimental testing.

FIGS. 8 through 10 are outline drawings of a sensor 400 used for experimental confirmation testing of the invention. FIG. 8 is a side view. FIG. 9 is an end view. FIG. 10 is a top view. Although the detailed implementation of the invention depends on the specific application at hand, the elements used in the basic design and approach reflected in FIGS. 8 through 10 are applicable to a wide variety of severe environments.

The design covers the 1 to 5 micron band and can be readily modified to include one or more ultraviolet channels, for example, a channel below 0.3 microns.

FIGS. 8 through 10 illustrate a sensor head, or collector, 420 which collects radiation and transmits the collected radiation along an optical conductor 430. Optical signals from optical conductor 430 are modulated by a chopper 435. After the signals are modulated, the modulated optical signals are detected in detector assembly 440. The outputs of detector assembly 440 are then sent to a computer. The entire arrangement is mounted on a base plate 415.

Figure 11:
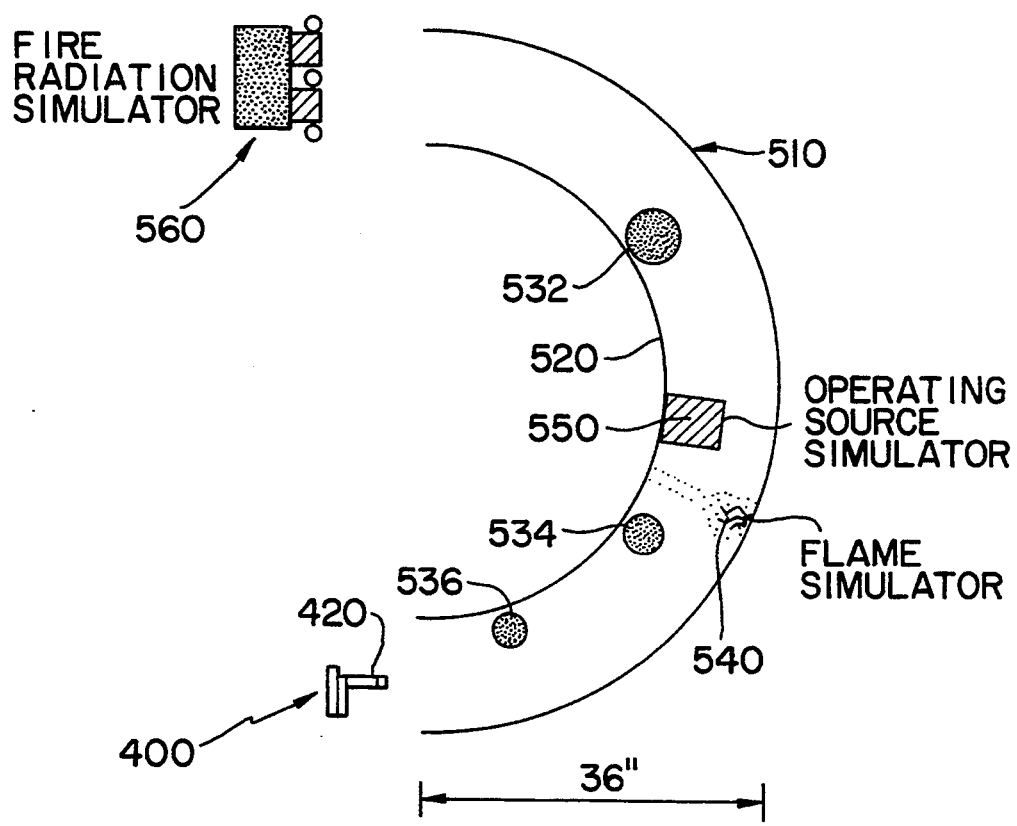
FIG. 11 illustrates a mock-up simulation of a jet engine nacelle used for initial experimental testing.

Important features of operation of the sensor 400 were demonstrated using the FIG. 11 full-scale simulation of a jet engine nacelle. In the FIG. 11 simulation, sensor 400 is aimed in between a simulated engine cowling 510 and a simulated engine case 520. Obstructions 532, 534, and 536; a flame simulator 540; and an operating source simulator 550 are located between the cowling 510 and the case 520. A fire radiation simulator 560 is also aimed in between cowling 510 and case 520.

The FIG. 11 arrangement simulates actual aircraft engine operation using radiant sources 540, 550, and 560. These sources have essentially the same spectral characteristics as those actually present in an aircraft engine nacelle, but have a much lower intensity. The sources 540, 550, and 560 are located at a distance and out of the direct line of sight of sensor 400. The obstructions 532, 534, and 536 simulate actual installation conditions which are present in various installations. The outputs of sensor 400 are displayed on a computer monitor in both numerical and graphical format.

In an important mode of operation the sensor tracks how closely the actual operation of the equipment being monitored follows initial conditions. This information is used to ascertain normal variation in the thermal conditions of the equipment being monitored.

There are typically a number of standard operating conditions and pathological conditions, such as fire and overheating, that are monitored. These standard operating and pathological conditions must be distinguished from spurious sources, such as solar radiation and artificial illumination. For each standard operating condition of the equipment being monitored, a unique set of spectral band signals is determined by initially operating the monitored equipment in each condition of interest. Then the multi-band spectral signature is measured and stored for subsequent real time comparison with equipment behavior. This initial calibration is performed on-line in real time to permit easy calibration of rapidly changing equipment.

The initial calibration procedure was demonstrated by establishing various combinations of thermal conditions in the FIG. 11 simulation. In an initial demonstration experiment, a six channel output was obtained for five conditions. The following five conditions were used as examples of the types of thermal conditions that are of interest in aircraft engines:

(1) Typical moderate operations at an average temperature of 600° F. (Condition "Opng").
(2) A low temperature flame condition. A common household type propane torch was used to generate a low temperature flame. Although the operating temperature and radiant intensity of a household torch is lower than what is encountered in actual aircraft engines, radiation indicative of a low temperature flame condition from the 4.4 micron $CO_2$ band can be detected in band 6. (Condition "LTFlame").
(3) Direct illumination of the sensor with a standard flashlight. This condition was selected to demonstrate an example of the ability to discriminate against spurious sources of radiation, such as radiation from artificial illumination, or from solar radiation. Discrimination has been verified in a number of independent experiments. (Condition "Lite").
(4) A fire condition. An important feature of the invention is the ability to determine the presence of fire uniquely and unequivocally. (Condition "Fire").

(5) A hot spot condition. A separate source of extra high temperature radiation was employed to simulate typical conditions that should be distinguished. (Condition "HotSpot").

Figure 14:
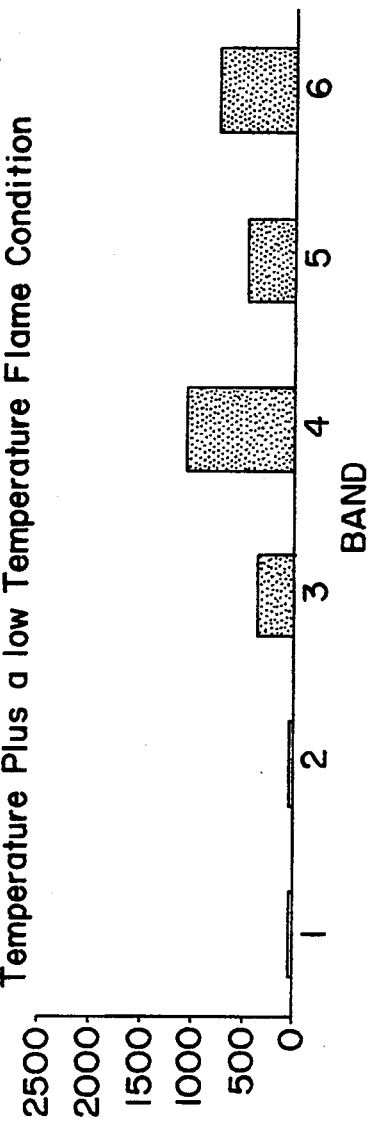
FIG. 14 is a computer display of multi-band signals for a 600° F. average temperature condition plus a low temperature flame condition.
Figure 15:
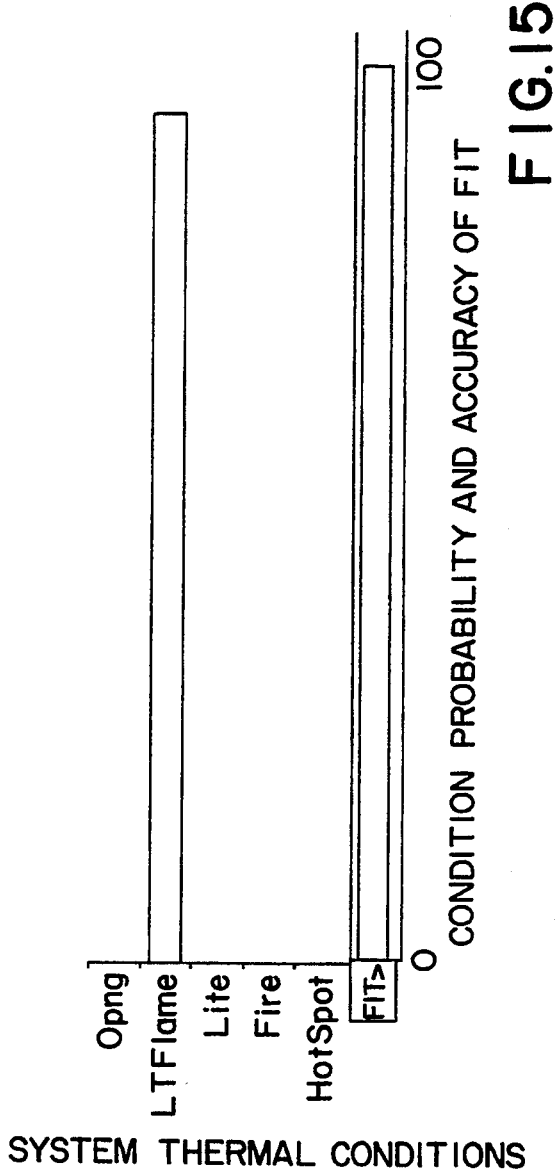
FIG. 15 is a computer display showing the condition probability and accuracy of fit corresponding to FIG. 14.
Figure 20:
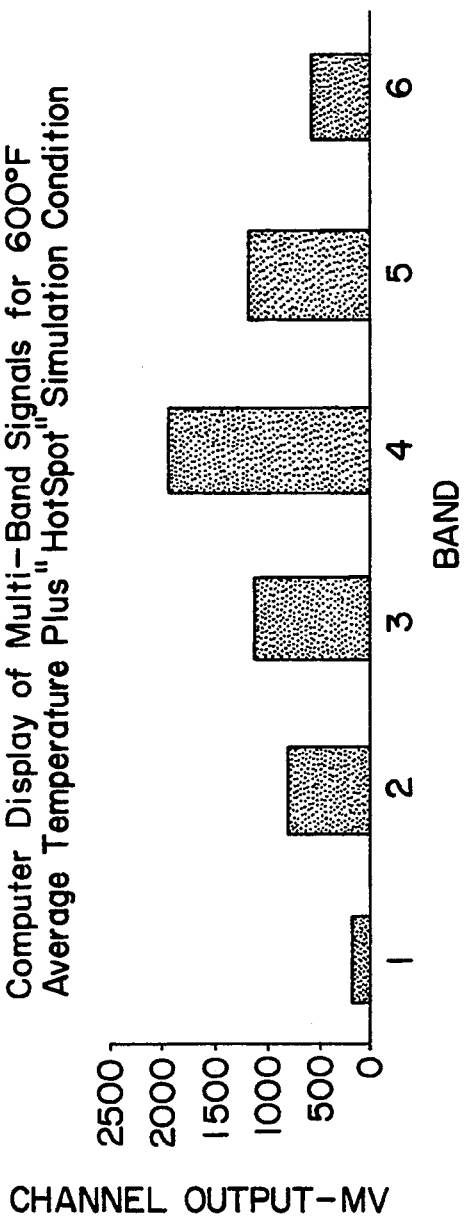
FIG. 20 is a computer display of multi-band signals for a 600° F. average temperature condition plus a hot spot simulation condition.
Figure 21:
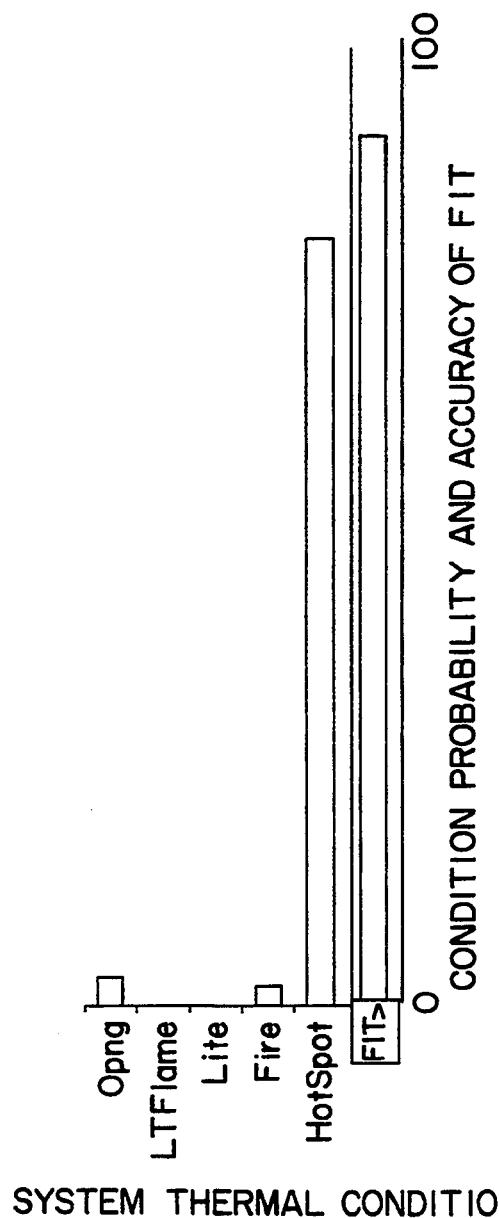
FIG. 21 is a computer display showing the condition probability and accuracy of fit corresponding to FIG. 20.

Results of initial testing are shown in FIGS. 12 through 21. FIG. 12 is a computer display of multi-band signals for a 600° F. average temperature operating condition. FIG. 13 is a computer display showing the condition probability and accuracy of fit corresponding to FIG. 12. FIG. 14 is a computer display of multi-band signals for a 600° F. average temperature condition plus a low temperature flame condition. FIG. 15 is a computer display showing the condition probability and accuracy of fit corresponding to FIG. 14. FIG. 16 is a computer display of multi-band signals for a 600° F. average temperature condition plus a flashlight condition. FIG. 17 is a computer display showing the condition probability and accuracy of fit corresponding to FIG. 16. FIG. 18 is a computer display of multi-band signals for a 600° F. average temperature condition plus a fire simulation condition. FIG. 19 is a computer display showing the condition probability and accuracy of fit corresponding to FIG. 18. FIG. 20 is a computer display of multi-band signals for a 600° F. average temperature condition plus a hot spot simulation condition. FIG. 21 is a completer display showing the condition probability and accuracy of fit corresponding to FIG. 20.

The display format of FIGS. 12 through 21 provides a convenient method of visualization. In FIGS. 12, 14, 16, 18, and 20, the signal from each of the six channels is shown in the form of vertical bars. The height of each vertical bar is proportional to the signal amplitude. A comparison of FIGS. 12, 14, 16, 18, and 20 demonstrates that each of the various conditions produces a unique spectral signature. Thus, comparison of detected multi-band signals with stored signature data indicates the operating conditions of the monitored aircraft engine.

In FIGS. 13, 15, 17, 19, and 21, results of the data analysis are displayed by horizontal bars. The amplitude of the upper horizontal bar in each figure is proportional to the probability that the system is in the particular thermal condition. The lower horizontal bar in each figure indicates the validity of the least squares minimization. These figures indicate that each of the five system conditions is unequivocally identified with negligible uncertainty by the invention.

The spectral bands employed in the above described confirmation testing are not ideal. Instead, the spectral bands were chosen on the basis of using in-stock filters that reasonably cover most of the 1 to 5 micron band. Extension or amplification of the least squares processing further increases condition identification flexibility. Other types of processing may be more appropriate in certain applications. However, this confirmation testing demonstrates that the invention can be applied to monitor equipment under a wide variety of thermal, structural, and environmental conditions.

Another specific installation example of the invention will now be described in detail.

Figure 22:
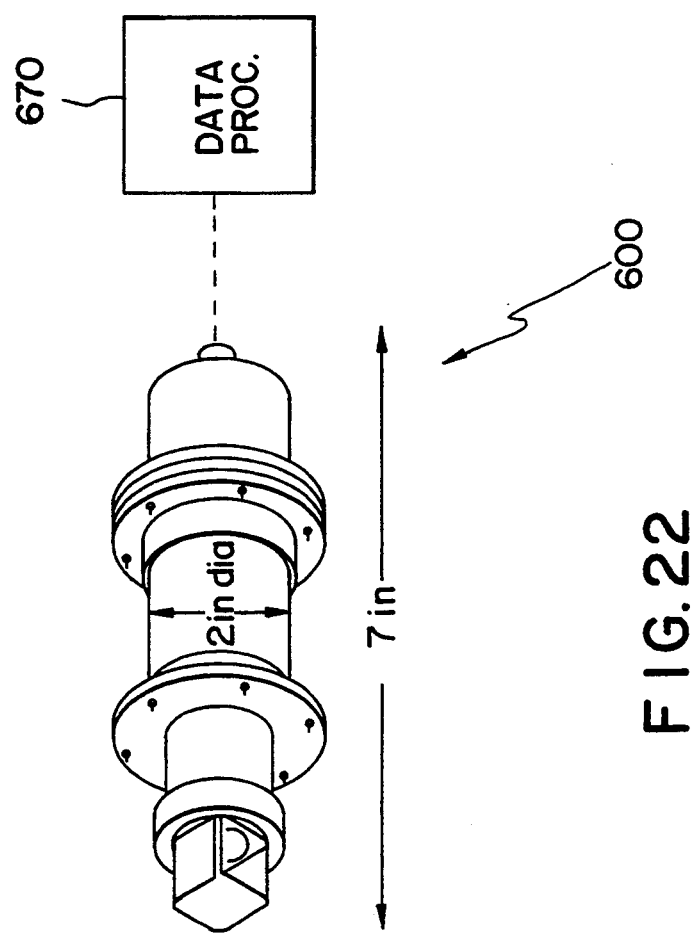
FIG. 22 illustrates the external structure of a thermal condition sensor system according to another preferred embodiment of the invention.
Figure 23:
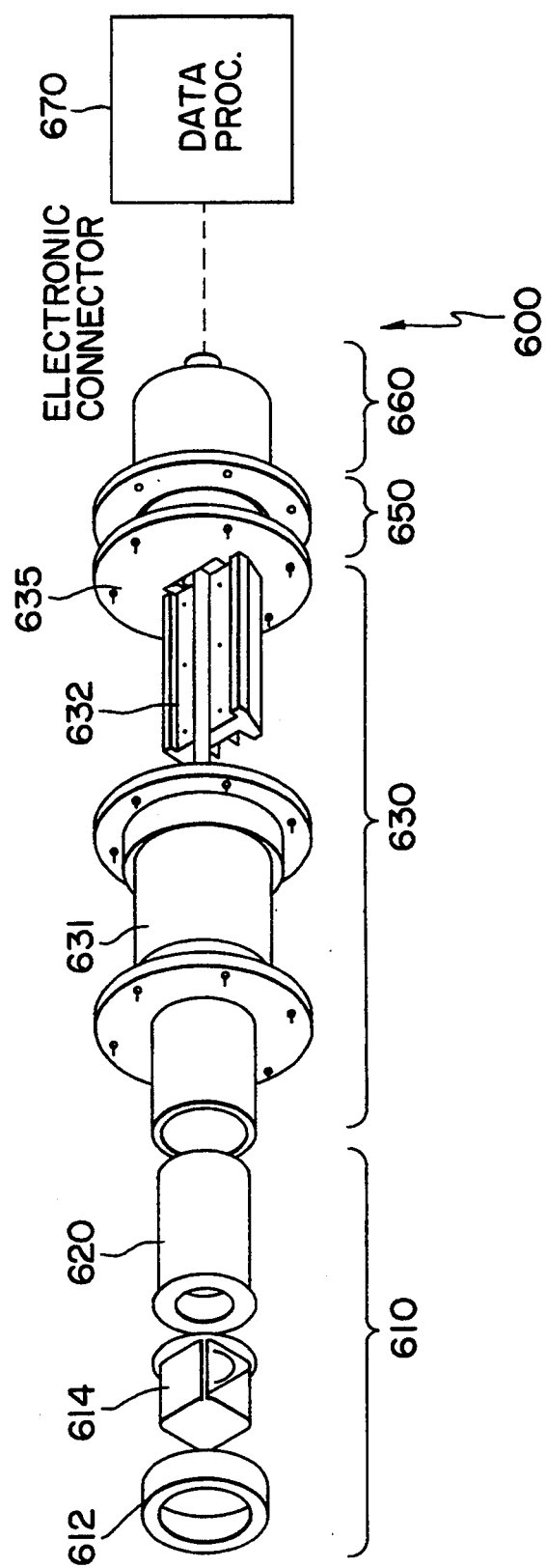
FIG. 23 illustrates an exploded view of major internal elements of the thermal condition sensor system of FIG. 22.

The thermal condition sensor system includes a compact, lightweight assembly that may be constructed in a number of configurations consistent with the appropriate optical and electrical paths, such as illustrated in FIG. 6. FIG. 22 illustrates a typical external structure of a thermal condition sensor which includes a cylinder constructed in four modules: —a collector module 610, a modulator/conductor module 630, a detector/preamp module 650, and an electronics/driver output module 660. The data processor 670 is located in a separate module downstream of the electronics driver/output module 660 in, for example, a convenient part of the aircraft, such as a fan case. If a totally self-contained sensor system is desired, the data processor module can be directly connected to the rest of the sensor system.

Figure 24:
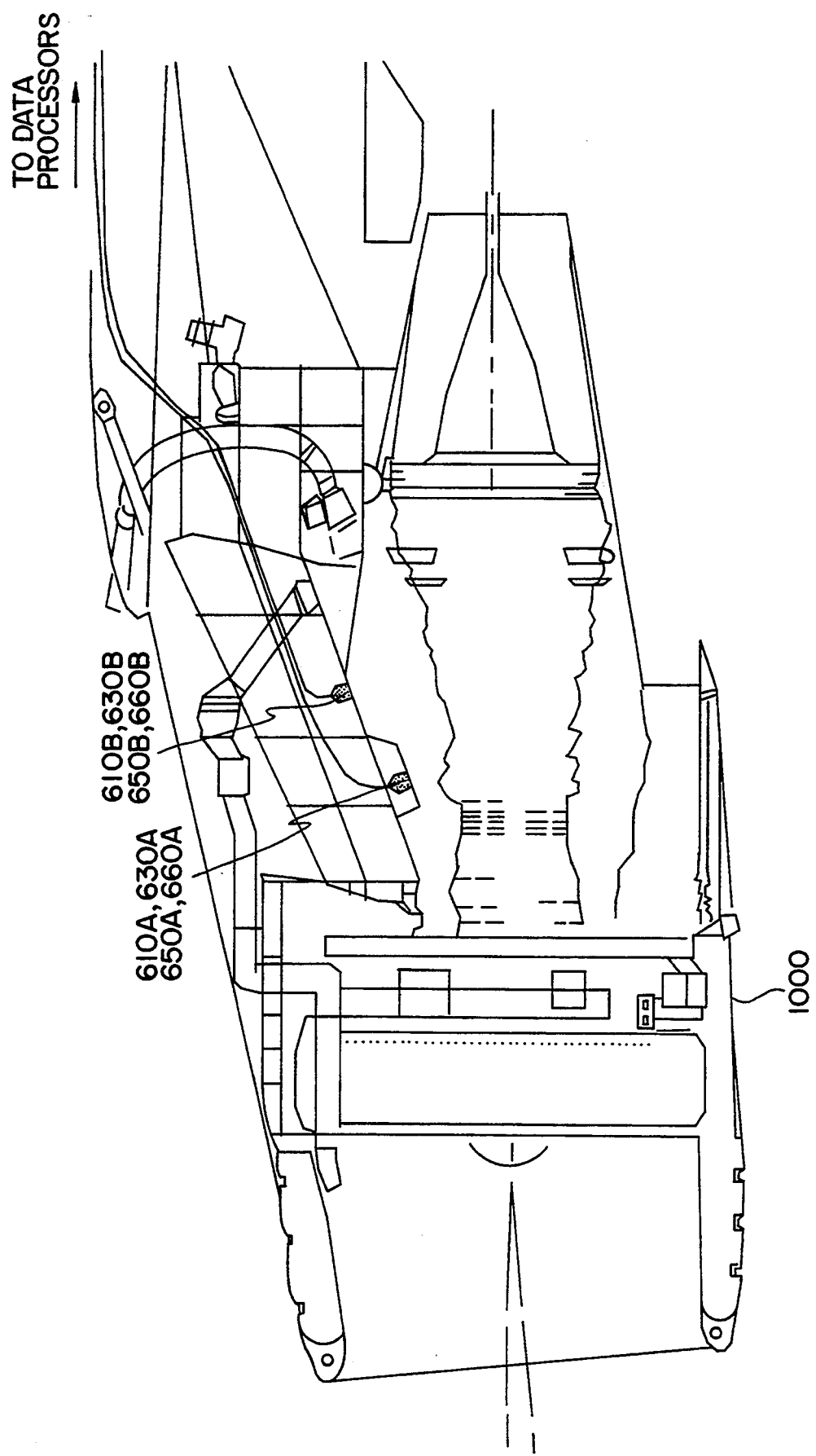
FIG. 24 illustrates the installation of thermal condition sensors for monitoring aircraft engine conditions.

To monitor an aircraft engine, the small diameter collector module 610 may be mounted through a hole in a strut facing the nacelle area, with the remaining modules isolated in the strut area. Other candidate mounting locations include the fan case, other parts of the airframe, or possibly on special brackets located elsewhere in the nacelle. FIG. 24 illustrates one possible installation of a two sensor head system installed in aircraft engine 1000. In the FIG. 24 installation, modules 610A, 630A, 650A, and 660A comprise the first sensor head and modules 610B, 630B, 650B, and 660B comprise the second sensor head. The specific installation arrangement will vary depending upon the particular engine at hand.

The collector module 610 is designed to meet technical standards operating requirements. These requirements include survival of a direct 2000° F. flame for 5 minutes without ceasing to function. Modules 630, 650, and 660 are thermally isolated from the collector module 610 because the more sensitive components in modules 630, 650, and 660 are subjected to lower temperatures further away from the aircraft engine.

Figure 25:
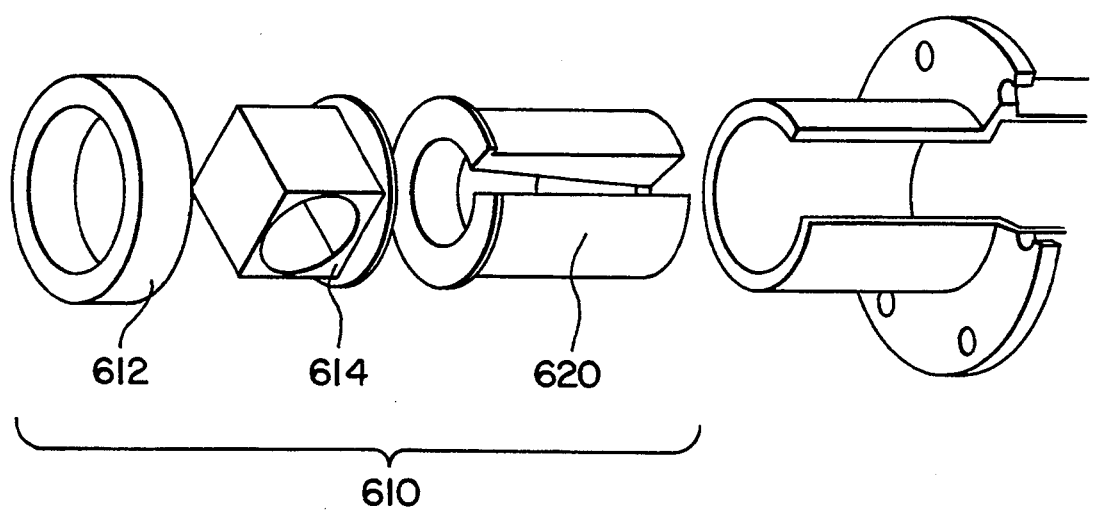
FIG. 25 is a blown-up view of a collector module of FIG. 22.
Figure 26:
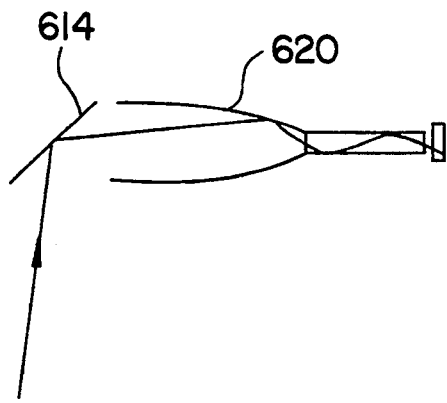
FIG. 26 illustrates a ray path for transverse radiation collected by the collector of FIG. 25.

The field-of-view of the collector module 610 matches the characteristics of the particular area being monitored, which in the case of aircraft engines is the engine nacelle. FIG. 25 provides a blown-up view of collector module 610. As illustrated in FIG. 25, the collector module 610 includes a screw cap 612, a reflector 614, and a collector 620. The reflector 614 is a right angle metallic reflector which reflects transverse radiation. This arrangement permits the sensor head to be mounted on a strut perpendicular to the engine cowling to collect rays moving orthogonal to the sensor head, as shown in FIG. 26.

Figure 27:
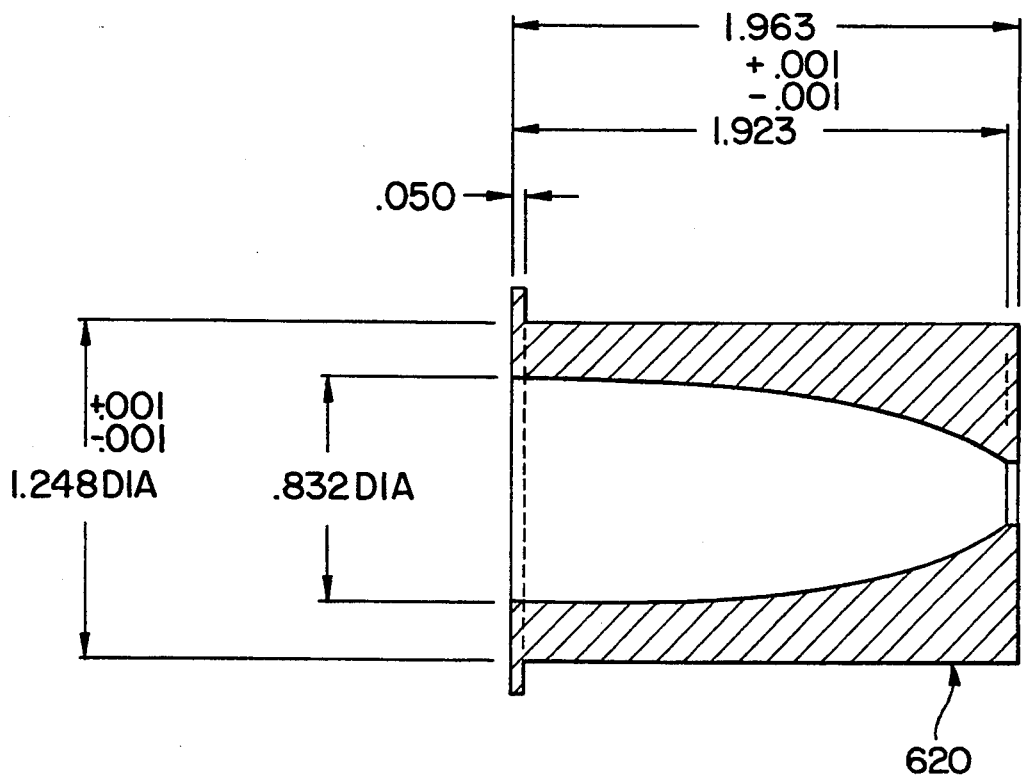
FIG. 27 is a side view of the collector of FIG. 25.
Figure 28:
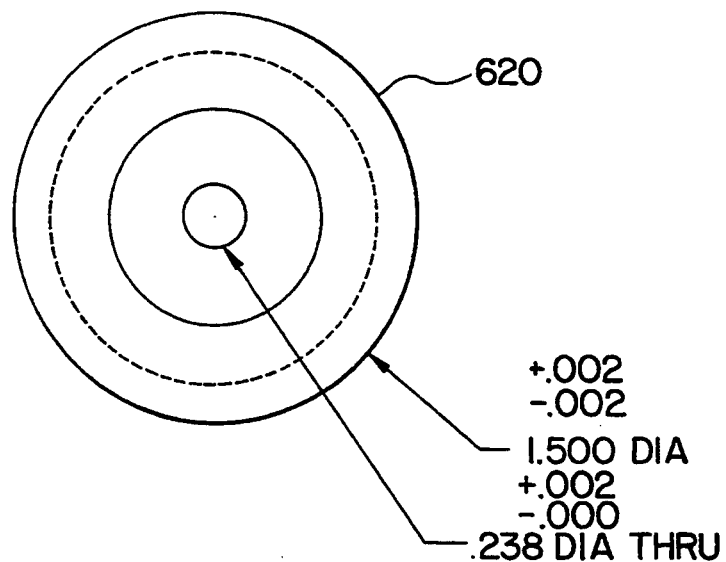
FIG. 28 is an end view of the collector of FIG. 25.

The collector module 610 efficiently collects optical radiation over a sharply delineated field-of-view. FIGS. 27 and 28 illustrate a typical optical collector design. FIG. 27 illustrates a side view and FIG. 28 illustrates an end view. The collector design is based on a compound parabolic concentrator configuration. The collector 620 is designed for a field-of-view of 31°, which is appropriate for many types of engine nacelle/cowling arrangements. Other fields-of-view are provided by changing the dimensions of the collector. The dimensions should satisfy the following relationships:

$$L = (a + a') Cot\theta_0 \qquad (8)$$

and $$a'/a = \sin\theta_0 / \sin\theta_f \qquad (9)$$

where

L is the length of the collector, or concentrator;
a is the front radius of the collector;
a' is the rear radius of the collector;
$\Theta_0$ is the half-angle maximum entrance angle; and
$\Theta_f$ is the half-angle maximum exit angle.
For a 31° collector $\Theta_0$ is 15.5° and $\Theta_f$ is 70°.

Figure 29:
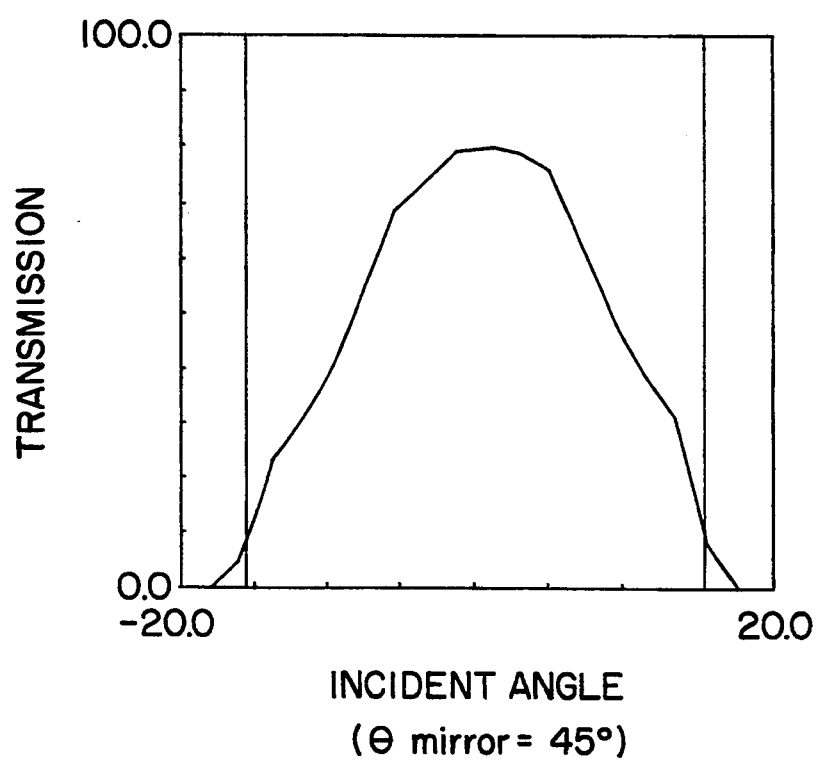
FIG. 29 is a graph of transmission versus angle of incidence for the collector of FIG. 25.

Results of an analysis of transmission versus angle of incidence for collector 620 are illustrated in FIG. 29. Analysis indicates that a mirror orientation tolerance of 2° or greater is acceptable.

Modulator/conductor module 630 provides the dual functions of thermal isolation and optical chopping. Optical radiation which is picked up by the collector module 610 is transmitted by a sapphire light pipe 632 in modulator/conductor module 630. The sapphire light pipe 632 is rugged, thermally resistant, and has high optical transmission in the 1 to 5 micron range and in the ultraviolet band. Light pipe 632 is enclosed in a housing 631, which consists of a thermal insulation case with metal flanges at each end.

A flange-mounted resonant tuning fork chopper 635 is located along the longitudinal direction of module 630. Chopper 635 has moving blades at right angles to the longitudinal direction at the far end of the modulator/conductor module 630, just in front of the detector/preamp module 650. At the chopper 635, transmission is alternately allowed and blocked at a low frequency, such as 71 Hz±5%.

Figure 33:
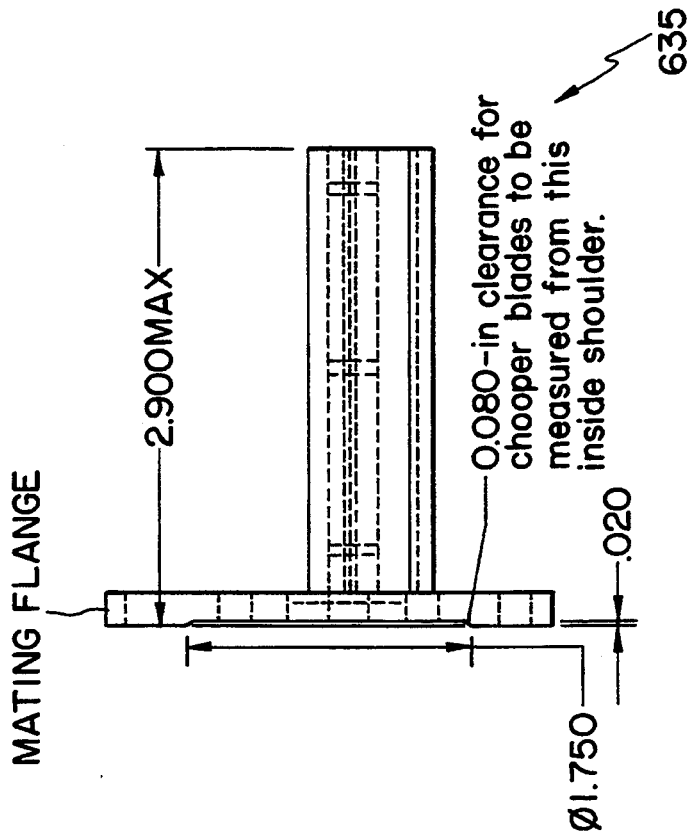
FIG. 33 is a side view of the chopper of FIG. 22.
Figure 32:
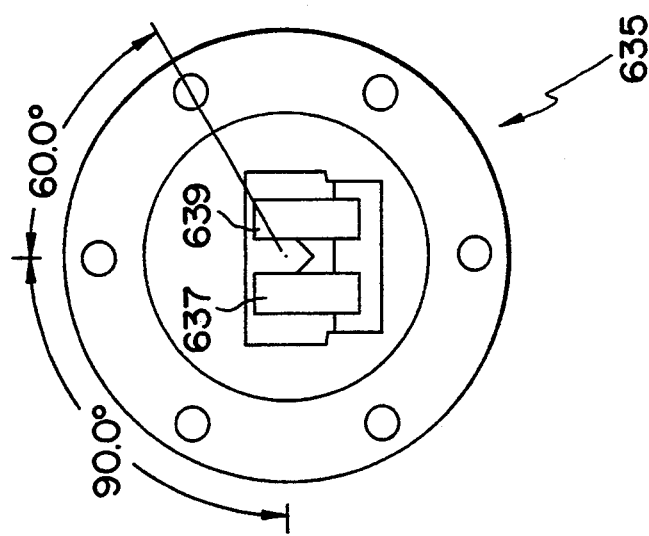
FIG. 32 is another end view of the chopper of FIG. 22.

FIGS. 30 through 33 illustrate a suitable design for chopper 635, which utilizes blades 637 and 639. FIG. 30 is a top view. FIGS. 31 and 32 are end views. FIG. 33 is a side view. The chopper 635 is a modification of a chopper available from Philamon Corporation. The standard Philamon design forms part of a special assembly which includes a V groove for holding the sapphire rod and a mating flange for connecting chopper 635 to the detector/preamp module 650. The chopper 635 is driven by an electronic circuit available from Philamon that assures stability of frequency and extension under shock and vibration conditions.

The third module is the detector/preamp module 650. The detector/preamp module 650 includes a seven channel compact detector array that receives the transmitted radiation emitted from the end of the sapphire light pipe 632. The detector array is placed at the front end of the detector/preamp module 650. The detector/preamp module 650 abuts the conductor/modulator module 630 such that the end of sapphire light pipe 632 is less than 2 mm away from the window of the detector array. Each of the seven channels responds to a different spectral band, as determined by optical filters placed in front of each detector element. The detector/preamp module 650 also includes first stage preamplifiers and circuitry associated with reference channel seven.

Figure 34:
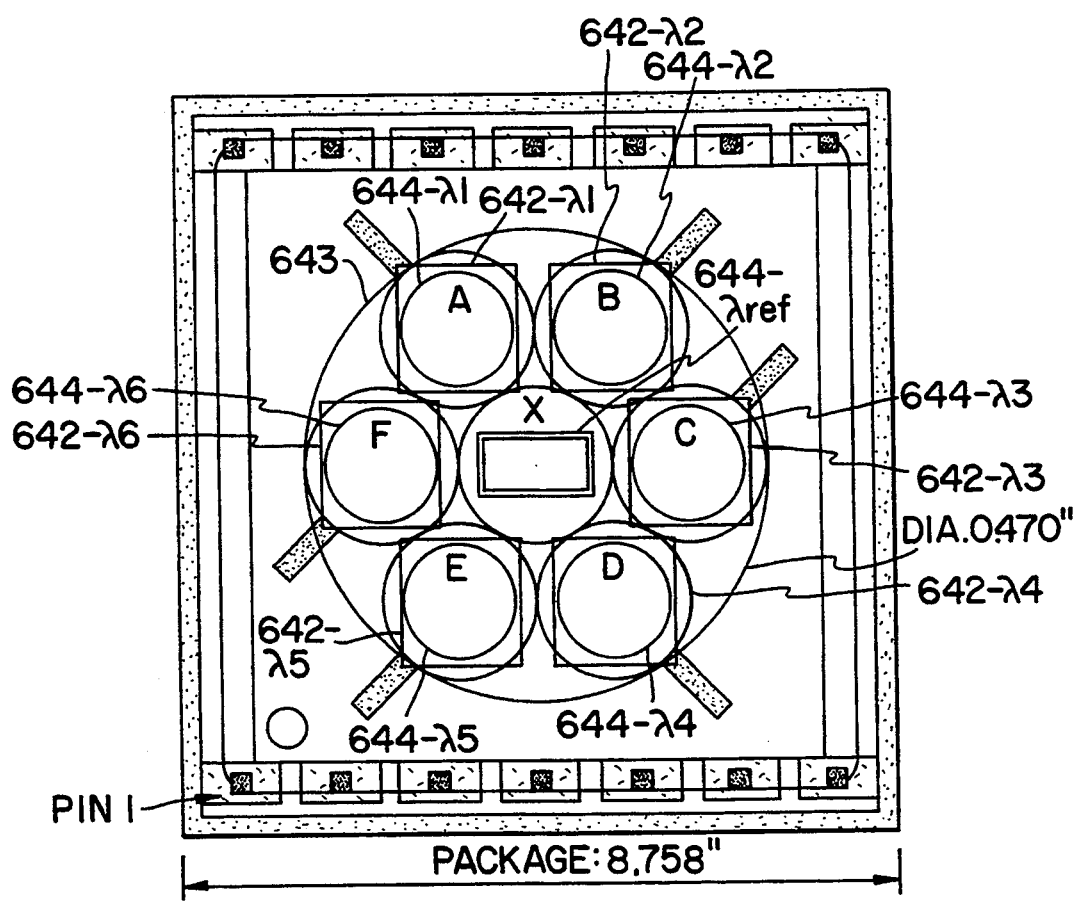
FIG. 34 is a top view of a detector array of FIG. 22.
Figure 35:
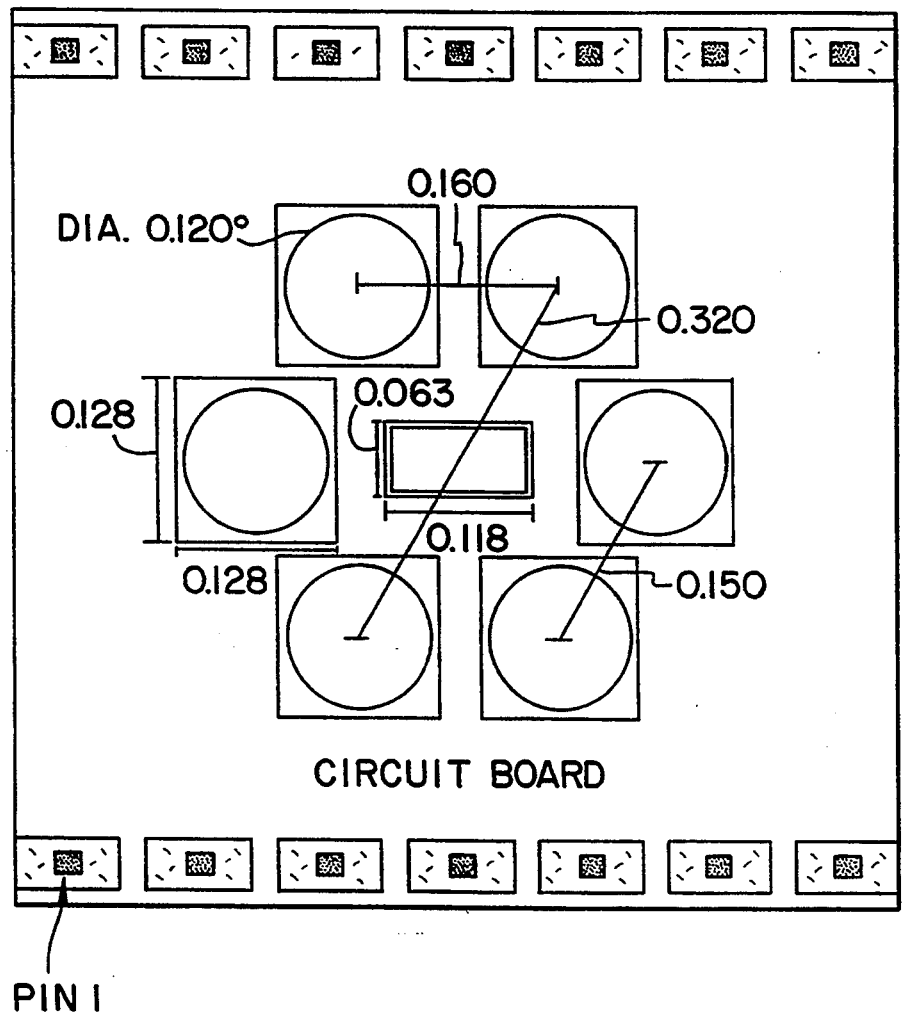
FIG. 35 illustrates the dimensions of the detector array of FIG. 34.

FIG. 34 is a top view of the detector array and FIG. 35 shows the dimensions of the detector array. The detector array contains six closely spaced pyroelectric detector elements $644$-$\lambda 1$ to $644$-$\lambda 6$ in a circular configuration. Separate spatial filters $642$-$\lambda 1$ to $642$-$\lambda 6$ are placed in front of the detector elements. This configuration limits loss of the optical rays emitted from sapphire light pipe 632. The detector array also includes a silicon detector element $644$-$\lambda ref$ which is used in the reference channel for self-checking, as described above.

The detector array is electrically connected by a cable to the driver/output module 660. The driver/output module 660 provides the control signals for chopper 635 and also provides a second stage of amplification in a second stage of amplifiers. The outputs of the second stage amplifiers are sent to an analog-to-digital (A/D) converter, which in turn provides digital outputs for subsequent data processing. The detailed circuit design of the driver/output module 660 will be described below in connection with FIG. 36.

The digital output is in the form of a multiplexed digital signal representative of the amplitudes of the detected radiation in each spectral band and the reference channel. The digital output is analyzed in accordance with the multi-channel analysis techniques described above. This data analysis sequentially proceeds in the following four stages: (1) initial fire recognition, (2) sensor evaluation, (3) non-negative least squares data fits, and (4) continuing evaluation of thermal conditions.

Both the conductor/modulator module 630 and the detector/preamp module 650 are designed to operate over a temperature range from −65° C. to 150° C. and to withstand temperatures of up to 250° C. without permanent degradation. The collector module 610 can operate at much higher temperatures. The driver/output module 660 can withstand −65° C. to 125° C.

In the thermal condition sensor system 600 the optical filters $642$-$\lambda 1$ to $642$-$\lambda 6$ are selected to fully cover the spectral range in six spectral bands with minimal overlap. Full coverage provides maximum information. Overlap is minimized to eliminate redundant data.

The distribution of the spectral bands is carefully selected in accordance with the requirements of the particular application at hand, for example, fire detection or over-temperature detection, and to minimize contributions from radiation due to temperatures at the conductor/modulator module 630 and the detector/preamp module 650. When the maximum temperature in modules 630 and 650 is 150° F., the following spectral bands, in microns, are an example of the types to be used:

| Channel: | 1 | 2 | 3 | 4 | 5 | 6 |
|---|---|---|---|---|---|---|
| Band: | 1.0–1.5 | 1.5–2.0 | 2.0–2.5 | 2.5–3.0 | 3.0–3.5 | 4.35–4.45 |

When the maximum temperature in modules 630 and 650 is 300° F. the following spectral bands, in microns, are an example of the types to be used:

| Channel: | 1 | 2 | 3 | 4 | 5 | 6 |
|---|---|---|---|---|---|---|
| Band: | 1.0–1.4 | 1.4–1.8 | 1.8–2.2 | 2.2–2.6 | 2.6–3.0 | 4.35–4.45 |

In both of the above examples, channel 6 has been selected to have a narrow band that is responsive to 4.40 micron $CO_2$ radiation that is emitted from hydrocarbon fires.

Figure 36:
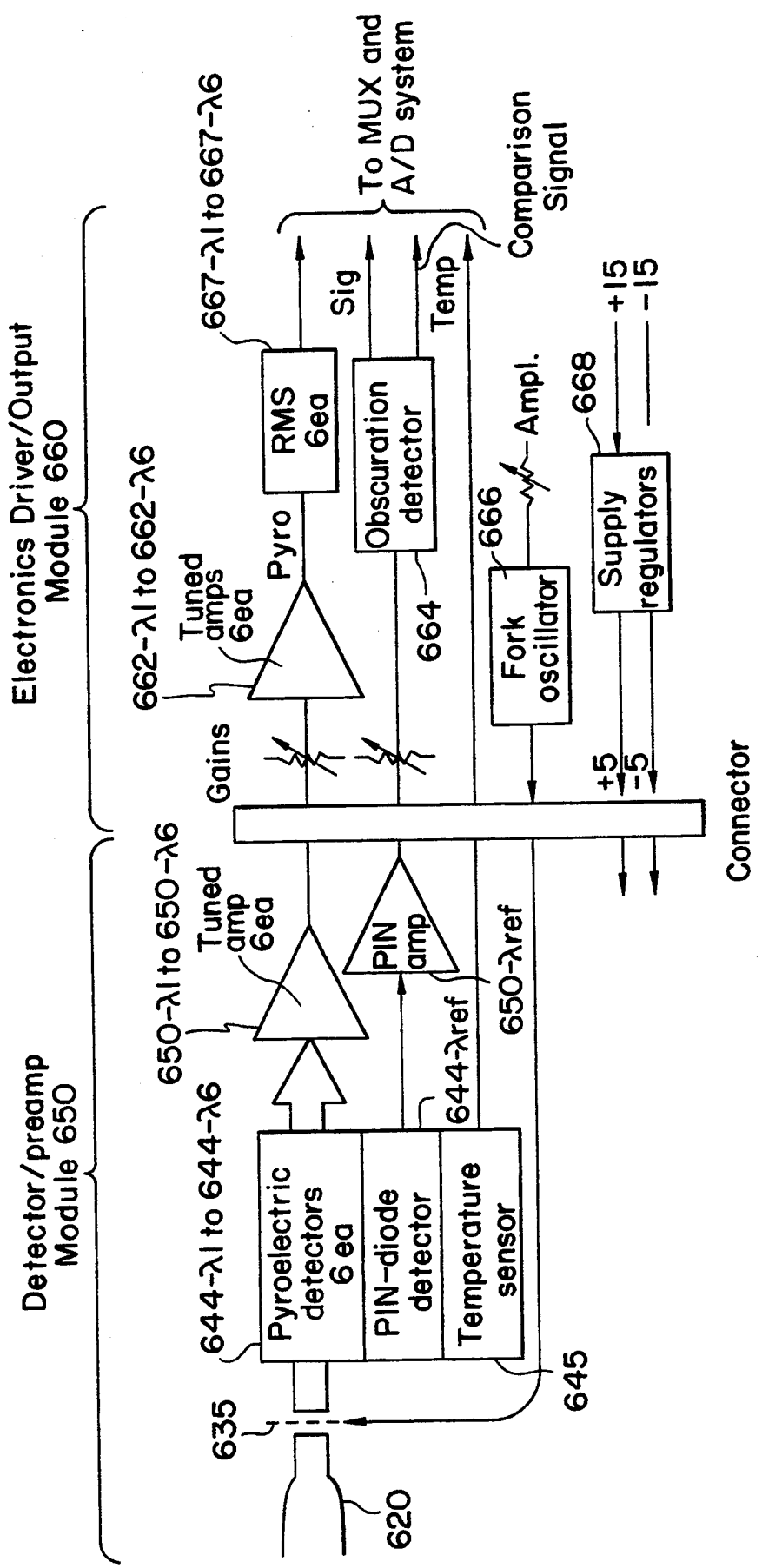
FIG. 36 illustrates circuitry for the thermal condition sensor of FIG. 22.

FIG. 36 illustrates the circuitry for the detector/preamp module 650 and the driver/output module 660. In FIG. 36, the output from each pyroelectric detector element, $644$-$\lambda 1$ to $644$-$\lambda 6$, is amplified by a two stage amplifier consisting of amplifiers $650$-$\lambda 1$ to $650$-$\lambda 6$ and amplifiers $662$-$\lambda 1$ to $662$-$\lambda 6$. The two stage amplifier raises the signal levels to the levels required to drive the A/D converter. Each of amplifiers $650$-$\lambda 1$ to $650$-$\lambda 6$ and $662$-$\lambda 1$ to $662$-$\lambda 6$ is a tuned amplifier which operates at a center frequency of 71 Hz, the mechanical chopper frequency, with a bandwidth of 10 to 20 Hz. The second stage gain is adjustable from 0 to 72 dB and the dynamic range of both amplifiers is 86 dB at full gain. Military standard components are used in the detector/preamp module 650 to permit operation at high temperatures.

In the electronics driver/output module 660, a dc level signal is generated for each channel using rms/rectifier circuits $667$-$\lambda 1$ to $667$-$\lambda 6$. A multiplexer circuit downstream of the electronics driver/output module 660 switches the dc signals for sequential input to a 16 bit A/D converter, which in turn provides digital outputs for subsequent data processing. The module 660 also includes fork oscillator driver electronics 666 for chopper 635. A temperature sensor 645 provides an indication of the ambient temperature of detector/preamp module 650. Obscuration detector 664 is designed and operates similarly to the reference channel illustrated in FIG. 7. Because the objective of the above-described signal processing is simply to provide a multiplexed digital output with low noise, other techniques can be used to perform the above-described signal processing functions. For example, major filtering can be performed by software, thereby dispensing with the need for an rms/rectifier circuit.

After A/D conversion the digital data is analyzed using the multi-channel analysis described above. The output of the data analysis is a report of system conditions selected for attention, for example, normal operation information, over-temperature conditions, and a fire. The analysis proceeds in the following four stages.

Stage 1: Initial fire recognition to determine if a nearby fire exists. If a nearby fire exists then saturation is detected on all or most of the sensor channels, except for the reference channel.

Stage 2: Sensor evaluation to verify that the thermal condition sensor system 600 is operating properly. A self-check is performed using the reference channel. A logic check is also performed to verify that the six signal channels are operating within a physically relevant operating band.

Stage 3: Event determination to determine the best fit of the measured events to known operating conditions. This involves use of linear algebra least squares techniques to recognize all physically meaningful conditions.

Stage 4: Condition report generation by constructing and reporting the most likely estimate of the condition of the equipment being monitored. This includes a detailed analysis of all physically meaningful event subsets and a determination of when a signal warrants an alarm.

Thus, the invention provides numerous advantages over conventional devices. The invention collects optical radiation using non-imaging optics rather than lens-based optics. Use of non-imaging optics provides superior efficiency, a sharper field-of-view delineation, and a more rugged structure. The use of a light-guided internal optical transmission system and in-line separation of channels provides compact and rugged non-directional sensors. The use of multiple, that is, at least six, spectral bands provides redundancy and superior reliability and reduces false alarms. Multi-band analysis allows unambiguous determination of system conditions. Moreover, the wide spectral range of 5 microns serves to provide maximum information content.

The invention allows the determination of system thermal conditions such as average temperature, the presence of fire, and/or the presence of an over-temperature condition rather than just a determination of temperature. An integral reference channel permits self-checking. Because the optical signals are modulated by an integral resonant chopper, the modulator has no rotating parts that would degrade over time. The compact modular structure of the invention allows locating sensors in a strut or elsewhere in an airframe. The design also provides a thermal condition sensor system which meets applicable environmental requirements.

Although the invention has been described above with respect to certain specific embodiments, the scope of the invention is not limited to the specific embodiments disclosed. Other designs within the spirit and scope of the invention will be apparent to those skilled in the field after receiving the above teachings. The scope of the invention, therefore, is defined by reference to the following claims.

What is claimed is:

1. A thermal condition sensor system for monitoring aircraft equipment, said thermal condition sensor system comprising:
    a collector which collects radiation from said aircraft equipment;
    a detector assembly, coupled to said collector, which detects collected radiation over a discriminating spectral band region in at least three spectral bands and generates signals representative of detected radiation in each spectral band; and
    a processor, coupled to said detector assembly to receive said signals, which identifies an operating condition of said aircraft equipment from among a plurality of distinct possible operating conditions using interband comparison of said at least three spectral bands.

2. A thermal condition sensor system as set forth in claim 1, wherein said detector assembly includes pyroelectric detectors.

3. A thermal condition sensor system as set forth in claim 1, wherein said detector assembly detects collected radiation in at least six spectral bands and generates signals representative of detected radiation in each spectral band.

4. A thermal condition sensor system as set forth in claim 1, further comprising an optical conductor, located between said collector and said detector assembly, to thermally separate said detector assembly from said collector.

5. A thermal condition sensor system as set forth in claim 1, wherein said detector assembly detects collected radiation in at least three spectral bands in the range of 1 to 5 microns and generates signals representative of detected radiation in each spectral band.

6. A thermal condition sensor system as set forth in claim 1, wherein said processor determines said operating condition using ratios of amplitudes of said at least three spectral bands.

7. A thermal condition sensor system as set forth in claim 1, further comprising a reference light source which emits radiation having known characteristics into the vicinity of said aircraft equipment and a reference detector which collects radiation emitted from said reference light source.

8. A thermal condition sensor system as set forth in claim 1, further comprising a resonant tuning fork chopper to modulate collected radiation.

9. A thermal condition sensor system as set forth in claim 1, further comprising a non-rotating chopper to modulate collected radiation.

10. A thermal condition sensor system as set forth in claim 1, wherein said collector collects radiation from said aircraft equipment without contacting said aircraft equipment.

11. A thermal condition sensor system as set forth in claim 1, wherein said collector collects radiation over a precisely delineated field-of-view.

12. A thermal condition sensor system as set forth in claim 1, wherein said collector collects reflected radiation.

13. A thermal condition sensor system as set forth in claim 1, wherein said processor generates a report identifying the presence of fire in said aircraft equipment.

14. A thermal condition sensor system as set forth in claim 1, wherein said processor generates a report identifying the presence of incipient fire in said aircraft equipment.

15. A thermal condition sensor system as set forth in claim 1, wherein said processor generates a report identifying the presence of an over-temperature condition in said aircraft equipment.

16. A thermal condition sensor system for monitoring aircraft equipment, said thermal condition sensor system comprising:
 a collector which collects radiation from said aircraft equipment;
 a detector assembly, coupled to said collector, which detects collected radiation over a discriminating spectral band region in at least three spectral bands and generates signals representative of detected radiation in each spectral band; and
 a processor, coupled to said detector assembly to receive said signals, which generates a report of the thermal conditions of said aircraft equipment using interband comparison of said at least three spectral bands, wherein said processor determines said thermal conditions using a first ratio of an amplitude of a first spectral band to an amplitude of a second spectral band and checks this determination against a second ratio of an amplitude of a third spectral band to an amplitude of a fourth spectral band.

17. A thermal condition sensor system for monitoring equipment, said thermal condition sensor system comprising:
 a collector which collects radiation from said equipment;
 a detector assembly, coupled to said collector, which detects collected radiation over a discriminating spectral band region in at least three spectral bands and generates signals representative of detected radiation in each spectral band; and
 a processor, coupled to said detector assembly to receive said signals, which identifies an operating condition of said equipment from among a plurality of distinct possible operating conditions using interband comparison of said at least three spectral bands.

18. A thermal condition sensor system as set forth in claim 17, wherein said collector collects radiation from said equipment without contacting said equipment.

19. A method of monitoring aircraft equipment, said method comprising the steps of:
 (a) collecting radiation from said aircraft equipment without contacting said aircraft equipment;
 (b) detecting collected radiation over a discriminating spectral band region in at least three spectral bands and generating signals representative of detected radiation in each spectral band; and
 (c) identifying an operating condition of said aircraft equipment from among a plurality of distinct possible operating conditions using interband comparison of said at least three spectral bands.

20. A method as set forth in claim 19, wherein step (a) includes the step of collecting radiation from said aircraft equipment without contacting said aircraft equipment.

21. A method as set forth in claim 19, wherein step (b) includes detecting collected radiation in at least three spectral bands and generating signals representative of detected radiation in each spectral band using pyroelectric detectors.

22. A method as set forth in claim 19, wherein step (b) includes detecting collected radiation in at least six spectral bands and generating signals representative of detected radiation in each spectral band.

23. A method as set forth in claim 19, wherein step (b) includes detecting collected radiation in at least three spectral bands in the range of 1 to 5 microns and generating signals representative of detected radiation in each spectral band.

24. A method as set forth in claim 19, wherein step (c) includes determining said operating condition using a ratio of an amplitude of a first spectral band to an amplitude of a second spectral band.

25. A method as set forth in claim 19, further comprising the steps of emitting radiation having known characteristics into the vicinity of said aircraft equipment and collecting the emitted radiation.

26. A method as set forth in claim 19, wherein step (c) includes generating a report of said operating condition of said aircraft equipment using least squares analysis of said at least three spectral bands.

27. A method as set forth in claim 19, wherein between steps (a) and (b) the step of chopping collected radiation is performed.

28. A method of monitoring aircraft equipment, said method comprising the steps of:
 (a) collecting radiation from said aircraft equipment without contacting said aircraft equipment;
 (b) detecting collected radiation over a discriminating spectral band region in at least three spectral bands and generating signals representative of detected radiation in each spectral band; and
 (c) generating a report of the thermal conditions of said aircraft equipment using interband comparison of said at least three spectral bands, wherein step (c) includes determining said thermal conditions using a first ratio of an amplitude of a first spectral band to an amplitude of a second spectral band and checking this determination against a second ratio of an amplitude of a third spectral band to an amplitude of a fourth spectral band.

29. A method of monitoring equipment, said method comprising the steps of:
 (a) collecting radiation from said equipment;
 (b) detecting collected radiation over a discriminating spectral band region in at least three spectral bands and generating signals representative of detected radiation in each spectral band; and
 (c) identifying an operating condition of said equipment from among a plurality of distinct possible operating conditions using interband comparison of said at least three spectral bands.

30. A method as set forth in claim 29, wherein step (a) includes the step of collecting radiation from said equipment without contacting said equipment.

31. A method of monitoring aircraft equipment, said method comprising the steps of:
 (a) collecting radiation from said aircraft equipment;
 (b) detecting collected radiation over a discriminating spectral band region in at least three spectral bands and generating signals representative of detected radiation in each spectral band; and (c) identifying an operating condition of said aircraft equipment from among a plurality of distinct possible operating conditions using said signals.

32. A thermal condition sensor system for monitoring aircraft equipment, said thermal condition sensor system comprising:

a collector which collects radiation from said aircraft equipment;

a compact detector assembly, coupled to said collector, which detects collected radiation over a discriminating spectral band region in at least three spectral bands and generates signals representative of detected radiation in each spectral band;

an optical conductor, located between said collector and said compact detector assembly, to conduct collected radiation from said collector to said compact detector assembly, said optical conductor having an optical path which is narrower than an optical path of said collector;

a modulator, located in said optical path of said optical conductor, to modulate collected radiation; and a processor, coupled to said compact detector assembly to receive said signals, which identifies an operating condition of said aircraft equipment from among a plurality of distinct possible operating conditions using interband comparison of said at least three spectral bands.

33. A thermal condition sensor system for monitoring aircraft equipment, said thermal condition sensor system comprising:

a non-imaging collector which collects radiation from said aircraft equipment;

a detector assembly, coupled to said non-imaging collector, which detects collected radiation over a discriminating spectral band region in at least three spectral bands and generates signals representative of detected radiation in each spectral band; and a processor, coupled to said detector assembly to receive said signals, which generates a report of the thermal conditions of said aircraft equipment using interband comparison of said at least three spectral bands.

34. A method of monitoring aircraft equipment, said method comprising the steps of:

(a) collecting radiation from said aircraft equipment, without contacting said aircraft equipment, using a non-imaging collector;

(b) detecting collected radiation over a discriminating spectral band region in at least three spectral bands and generating signals representative of detected radiation in each spectral band; and (c) generating a report of the thermal conditions of said aircraft equipment using interband comparison of said at least three spectral bands.

* * * * *